United States Patent
Asakura

(10) Patent No.: US 11,885,825 B2
(45) Date of Patent: Jan. 30, 2024

(54) AUTOMATED ANALYZER AND METHOD OF CONTROLLING THE AUTOMATED ANALYZER

(71) Applicant: JEOL Ltd., Tokyo (JP)

(72) Inventor: Makoto Asakura, Tokyo (JP)

(73) Assignee: JEOL Ltd., Tokyo (JP)

( * ) Notice: Subject to any disclaimer, the term of this patent is extended or adjusted under 35 U.S.C. 154(b) by 589 days.

(21) Appl. No.: 16/924,589

(22) Filed: Jul. 9, 2020

(65) Prior Publication Data

US 2021/0011044 A1    Jan. 14, 2021

(30) Foreign Application Priority Data

Jul. 11, 2019    (JP) .................................. 2019-129018

(51) Int. Cl.
  *G01N 35/10*    (2006.01)
  *B01L 3/00*    (2006.01)
  *G01N 35/00*    (2006.01)

(52) U.S. Cl.
  CPC ............ *G01N 35/1004* (2013.01); *B01L 3/52* (2013.01); *B01L 13/00* (2019.08);
  (Continued)

(58) Field of Classification Search
  CPC ..... B01L 13/00; B01L 3/52; G01N 35/00584; G01N 35/1002; G01N 35/1009; G01N 2035/00534
  See application file for complete search history.

(56) References Cited

U.S. PATENT DOCUMENTS 6,187,270 B1 *  2/2001  Schmitt ................... B03C 1/288
                                                                                  210/695
6,579,453 B1 *  6/2003  Bachler ................... B03C 1/288
                                                                                  209/222
(Continued)

FOREIGN PATENT DOCUMENTS

CN    109521214 A    3/2019
JP    S63-273063 A    11/1988
(Continued)

OTHER PUBLICATIONS

Extended European Search Report issued in EP20182310.1 dated Feb. 3, 2021.
(Continued)

*Primary Examiner* — Shogo Sasaki
(74) *Attorney, Agent, or Firm* — The Webb Law Firm

(57) ABSTRACT

An automated analyzer including: a stirring part provided with a stirring bar; a cleaning part that cleans the stirring bar; and a control unit that controls the stirring part and the cleaning part, when the control unit causes the stirring part to stir a liquid containing a specimen in a second cycle subsequent to a first cycle, the control unit performing first processing that sets a range of the stirring bar to be cleaned in the second cycle as a cleaning range R2, and when the control unit does not cause the stirring part to stir the liquid in the second cycle, the control unit performing second processing that sets a range of the stirring bar to be cleaned in at least one of the first cycle and the second cycle as a cleaning range R4 that is wider than the cleaning range R2.

5 Claims, 18 Drawing Sheets

(52) U.S. Cl.
CPC ... *G01N 35/00584* (2013.01); *G01N 35/1002* (2013.01); *G01N 35/1009* (2013.01); *G01N 2035/00534* (2013.01)

(56) References Cited

U.S. PATENT DOCUMENTS

| | | | |
|---|---|---|---|
| 8,470,267 B2* | 6/2013 | Holenstein | B01L 3/5085 422/549 |
| 2005/0013741 A1* | 1/2005 | a' Brassard | G01N 33/54326 210/695 |
| 2012/0003731 A1 | 1/2012 | Kuroda | |
| 2012/0017945 A1 | 1/2012 | Gut | |
| 2018/0161829 A1 | 6/2018 | Horie et al. | |
| 2018/0369882 A1 | 12/2018 | Ota | |

FOREIGN PATENT DOCUMENTS

| | | | |
|---|---|---|---|
| JP | 2003098178 | A | 4/2003 |
| JP | 201060522 | A | 3/2010 |
| JP | 2010210596 | A | 9/2010 |
| JP | 201227025 | A | 2/2012 |
| JP | 2013253826 | A | 12/2013 |
| JP | 20197884 | A | 1/2019 |

OTHER PUBLICATIONS

Office Action issued in JP2019-129018 dated Jul. 27, 2021.
Office Action issued in CN202010640125.6 dated Dec. 12, 2023.

* cited by examiner

| FIRST CYCLE | S50 | S52 | S54 | S56 | S62 |

| SECOND CYCLE | S80 | S82 | S84 | S86 | S90 |

| THIRD CYCLE | S50 | S52 | S54 | S56 | S60 |

FIG. 24

AUTOMATED ANALYZER AND METHOD OF CONTROLLING THE AUTOMATED ANALYZER

CROSS-REFERENCE TO RELATED APPLICATION

This application claims priority to Japanese Patent Application No. 2019-129018 filed Jul. 11, 2019, the disclosure of which is hereby incorporated by reference in its entirety.

BACKGROUND OF THE INVENTION

Field of the Invention

The present invention relates to an automated analyzer and a method of controlling the automated analyzer.

Description of Related Art

An automated analyzer is an apparatus for analyzing a component of a specimen by inducing a reaction between the specimen and a reagent. A known automated analyzer is a biochemical analyzer for analyzing components contained in a specimen, e.g., blood or urine. In a biochemical analyzer, for example, a specimen diluted under certain conditions is dispensed into a reaction container and then is mixed with a reagent for an analysis item in the reaction container so as to induce a reaction. Thereafter, the absorbance of the diluted specimen in the reaction container is measured and is converted into a concentration, allowing an analysis on a substance to be measured in the specimen.

In an automated analyzer, a specimen dispensed into a reaction container and a reagent are stirred by a stirring bar. The stirring of the specimen and the reagent by the stirring bar causes the adhesion of liquid on the stirring bar. When the stirring bar with liquid adhering thereto is used to stir a specimen dispensed in a subsequent reaction container and a reagent, liquid in the subsequent reaction container is mixed with the liquid of the preceding reaction container, resulting in an incorrect analysis. Thus, it is necessary to clean the stirring bar after stirring in the automated analyzer.

For example, as a method of cleaning a stirring bar, JP-A-2013-253826 discloses a method of cleaning a stirring bar by immersing the stirring bar into a cleaning fluid.

In the cleaning step of the stirring bar, the stirring bar is immersed into a cleaning liquid with a wider range than the adhesion range of a specimen or the like. The stirring bar is cleaned by a mechanical operation of the analyzer and thus the cleaning range of the stirring bar is kept. Thus, the stirring bar may have contaminated deposits on a boundary between a part immersed into the cleaning liquid and a part not immersed into the cleaning liquid.

A probe for dispensing liquid is also cleaned like the stirring bar after dispensing the liquid. Thus, the probe may have contaminated deposits on a boundary between a part immersed into the cleaning liquid and a part not immersed into the cleaning liquid.

SUMMARY OF THE INVENTION

According to a first aspect of the invention, there is provided an automated analyzer including:
a stirring part provided with a stirring bar;
a cleaning part that cleans the stirring bar; and
a control unit that controls the stirring part and the cleaning part,
when the control unit causes the stirring part to stir a liquid containing a specimen in a second cycle subsequent to a first cycle, the control unit performing first processing that sets a range of the stirring bar to be cleaned in the second cycle as a first range, and
when the control unit does not cause the stirring part to stir the liquid in the second cycle, the control unit performing second processing that sets a range of the stirring bar to be cleaned in at least one of the first cycle and the second cycle as a second range that is wider than the first range.

According to a second aspect of the invention, there is provided an automated analyzer including:
a dispensing unit provided with a probe;
a cleaning part that cleans the probe; and
a control unit that controls the dispensing unit and the cleaning part,
when the control unit causes the dispensing unit to dispense a liquid containing a specimen or a reagent in a second cycle subsequent to a first cycle, the control unit performing first processing that sets a range of the probe to be cleaned in the second cycle as a first range, and
when the control unit does not cause the dispensing unit to dispense the liquid in the second cycle, the control unit performing second processing that sets a range of the probe to be cleaned in at least one of the first cycle and the second cycle as a second range that is wider than the first range.

According to a third aspect of the invention, there is provided a method of controlling an automated analyzer including a stirring part provided with a stirring bar and a cleaning part that cleans the stirring bar,
the method including:
when causing the stirring part to stir a liquid containing a specimen in a second cycle subsequent to a first cycle, setting a range of the stirring bar to be cleaned in the second cycle as a first range; and
when not causing the stirring part to stir the liquid in the second cycle, setting a range of the stirring bar to be cleaned in at least one of the first cycle and the second cycle as a second range that is wider than the first range.

According to a fourth aspect of the invention, there is provided a method of controlling an automated analyzer including a dispensing unit provided with a probe and a cleaning part that cleans the probe,
the method including:
when causing the dispensing unit to dispense a liquid containing a specimen or a reagent in a second cycle subsequent to a first cycle, setting a range of the probe to be cleaned in the second cycle as a first range, and
when not causing the dispensing unit to dispense the liquid in the second cycle, setting a range of the probe to be cleaned in at least one of the first cycle and the second cycle as a second range that is wider than the first range.

BRIEF DESCRIPTION OF THE DRAWINGS

FIG. 24 is a diagram illustrating a modification of the operations of the first reaction-liquid stirring mechanism.

Figure 1:
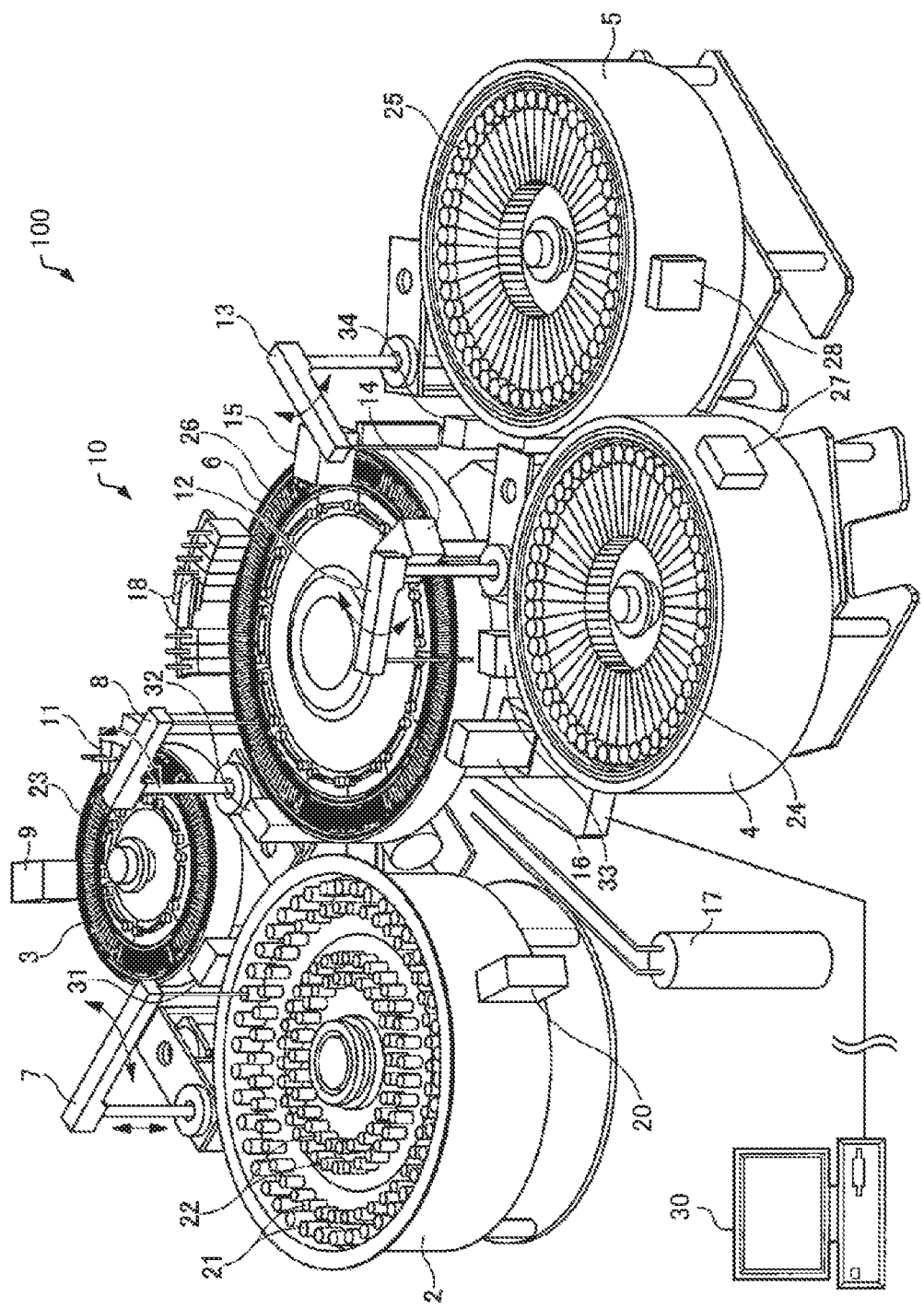
FIG. 1 illustrates the configuration of an automated analyzer according to an embodiment of the invention.

DESCRIPTION OF THE INVENTION (1) According to an embodiment of the invention, there is provided an automated analyzer including:

a stirring part provided with a stirring bar;

a cleaning part that cleans the stirring bar; and a control unit that controls the stirring part and the cleaning part, when the control unit causes the stirring part to stir a liquid containing a specimen in a second cycle subsequent to a first cycle, the control unit performing first processing that sets a range of the stirring bar to be cleaned in the second cycle as a first range, and when the control unit does not cause the stirring part to stir the liquid in the second cycle, the control unit performing second processing that sets a range of the stirring bar to be cleaned in at least one of the first cycle and the second cycle as a second range that is wider than the first range.

In the automated analyzer, the cleaning range of the stirring bar is changed depending on whether or not the liquid containing the specimen is stirred by the stirring part in the second cycle. Thus, the automated analyzer can reduce contaminated deposits on the stirring bar as compared with the constant cleaning range of the stirring bar.

(2) According to an embodiment of the invention, there is provided an automated analyzer including:

a dispensing unit provided with a probe;

a cleaning part that cleans the probe; and a control unit that controls the dispensing unit and the cleaning part, when the control unit causes the dispensing unit to dispense a liquid containing a specimen or a reagent in a second cycle subsequent to a first cycle, the control unit performing first processing that sets a range of the probe to be cleaned in the second cycle as a first range, and when the control unit does not cause the dispensing unit to dispense the liquid in the second cycle, the control unit performing second processing that sets a range of the probe to be cleaned in at least one of the first cycle and the second cycle as a second range that is wider than the first range.

In the automated analyzer, the cleaning range of the probe is changed depending on whether or not the liquid containing one of the specimen and the reagent is dispensed by the dispensing unit in the second cycle. Thus, the automated analyzer can reduce contaminated deposits on the probe as compared with the constant cleaning range of the probe.

(3) According to an embodiment of the invention, there is provided a method of controlling an automated analyzer including a stirring part provided with a stirring bar and a cleaning part that cleans the stirring bar, the method including:

when causing the stirring part to stir a liquid containing a specimen in a second cycle subsequent to a first cycle, setting a range of the stirring bar to be cleaned in the second cycle as a first range; and when not causing the stirring part to stir the liquid in the second cycle, setting a range of the stirring bar to be cleaned in at least one of the first cycle and the second cycle as a second range that is wider than the first range.

In the method of controlling the automated analyzer, the cleaning range of the stirring bar is changed depending on whether or not the liquid containing the specimen is stirred by the stirring part in the second cycle. Thus, the method of controlling the automated analyzer can reduce contaminated deposits on the stirring bar as compared with the constant cleaning range of the stirring bar.

(4) According to an embodiment of the invention, there is provided a method of controlling an automated analyzer including a dispensing unit provided with a probe and a cleaning part that cleans the probe, the method including:

when causing the dispensing unit to dispense a liquid containing a specimen or a reagent in a second cycle subsequent to a first cycle, setting a range of the probe to be cleaned in the second cycle as a first range, and when not causing the dispensing unit to dispense the liquid in the second cycle, setting a range of the probe to be cleaned in at least one of the first cycle and the second cycle as a second range that is wider than the first range.

In the method of controlling the automated analyzer, the cleaning range of the probe is changed depending on whether or not the liquid containing one of the specimen and the reagent is dispensed by the dispensing unit in the second cycle. Thus, the method of controlling the automated analyzer can reduce contaminated deposits on the probe as compared with the constant cleaning range of the probe.

Preferred embodiments of the invention are described in detail below with reference to the drawings. It is noted that the following embodiments do not unduly limit the scope of the invention as stated in the claims. In addition, all of the elements described below are not necessarily essential requirements of the invention.

1. Automated Analyzer

An automated analyzer according to an embodiment of the invention will be described below in accordance with the accompanying drawings. FIG. 1 illustrates the configuration of an automated analyzer 100 according to an embodiment of the invention.

The automated analyzer 100 is, for example, a biochemical analyzer that automatically measures the amount of a specific component contained in a specimen, e.g., blood or urine collected from a living body. The automated analyzer 100 may be configured for measurements widely conducted in the fields of, for example, immune serum and tumor markers in addition to biochemical items.

As illustrated in FIG. 1, the automated analyzer 100 includes an analysis unit 10 for measuring a specimen and a controller 30 for controlling the operations of parts constituting the analysis unit 10.

1.1. Configuration of Analysis Unit

The analysis unit 10 includes a sample turntable 2, a dilution turntable 3, a first reagent turntable 4, a second reagent turntable 5, and a reaction turntable 6. The analysis unit 10 further includes an original-specimen sampling probe 7, a diluted-specimen sampling probe 8, a dilution/stirring mechanism 9, a dilution-container cleaning mechanism 11, a first reagent dispensing probe 12, a second reagent dispensing probe 13, a first reaction-liquid stirring mechanism 14, a second reaction-liquid stirring mechanism 15, a multiwavelength photometer 16, a thermostat 17, a reaction-container cleaning mechanism 18, and a reader 20.

In the analysis unit 10, for example, a dispensing operation of a specimen by probes including the diluted-specimen sampling probe 8 and a stirring operation by the first reaction-liquid stirring mechanism 14 or the second reaction-liquid stirring mechanism 15 are repeated. The time of one cycle of repetition will be referred to as a cycle time.

The sample turntable 2 holds sample containers 21 for storing a specimen and insulating sample containers 22. The sample turntable 2 holds the sample containers 21 and the insulating sample containers 22. The specimen is stored in the sample containers 21. A diluent other than physiological saline, which is an ordinary diluent, and a detergent are stored in the insulating sample containers 22.

The dilution turntable 3 holds a plurality of dilution containers 23. In the dilution containers 23, an original specimen that is diluted after being sucked from the sample containers 21 located in the sample turntable 2, that is, a diluted specimen is stored.

The first reagent turntable 4 holds a plurality of first reagent containers 24. The second reagent turntable 5 holds a plurality of second reagent containers 25.

A first reagent is stored in the first reagent containers 24 and a second reagent is stored in the second reagent containers 25. The first reagent containers 24 and the second reagent containers 25 may be collectively referred to as "reagent containers."

The first reagent turntable 4 is provided with a first-reagent bar code reader 27 that reads bar codes attached on the sides of the first reagent containers 24. The second reagent turntable 5 is provided with a second-reagent bar code reader 28 that reads bar codes attached on the sides of the second reagent containers 25. The first-reagent bar code reader 27 and the second-reagent bar code reader 28 can specify the positions of the reagent containers used for measurement items. Moreover, the bar code readers can read reagent information including measurement items, lot numbers, and expiration dates.

The reaction turntable 6 holds a plurality of reaction containers 26. The reaction turntable 6 intermittently moves the reaction containers 26. The reaction turntable 6 performs the steps of, for example, moving the reaction containers 26 and stopping the reaction containers 26 for a certain time in one cycle.

The diluted specimen sampled from the dilution container 23 of the dilution turntable 3, the first reagent sampled from the first reagent container 24 of the first reagent turntable 4, and the second reagent sampled from the second reagent container 25 of the second reagent turntable 5 are poured into the reaction container 26. The diluted specimen, the first reagent, and the second reagent are stirred and react with one another in the reaction container 26.

The original-specimen sampling probe 7 sucks a predetermined amount of liquid, e.g., a specimen or a detergent from the sample container 21 or the insulating sample container 22, which is transferred to a preset suction position, and pours the sucked specimen and a predetermined amount of diluent (e.g., physiological saline), which is fed from the original-specimen sampling probe 7, into the dilution container 23 transferred to a preset pouring position. This dilutes the specimen to a concentration with a dilution factor of a predetermined multiple in the dilution container 23. In this way, the original-specimen sampling probe 7 dispenses the specimen into the dilution container 23. The original-specimen sampling probe 7 is cleaned by an original-specimen sampling probe cleaning mechanism 31.

The diluted-specimen sampling probe 8 sucks a predetermined amount of the diluted specimen from the dilution container 23 of the dilution turntable 3 and pours the sucked diluted specimen into the reaction container 26 of the reaction turntable 6. The diluted-specimen sampling probe 8 is cleaned by a diluted-specimen sampling probe cleaning mechanism 32.

The dilution/stirring mechanism 9 inserts a stirring bar, which is not illustrated, into the dilution container 23 and stirs the specimen and the diluent. The dilution-container cleaning mechanism 11 feeds a detergent from a detergent pump into a dilution-container cleaning nozzle and pours the detergent from the dilution-container cleaning nozzle into the dilution container 23.

The first reagent dispensing probe 12 sucks a predetermined amount of the first reagent from the first reagent container 24 transferred to a preset suction position, and then pours the sucked first reagent into the reaction container 26 transferred to a preset pouring position. The first reagent dispensing probe 12 is cleaned by a first reagent-dispensing-probe cleaning mechanism 33.

The second reagent dispensing probe 13 sucks a predetermined amount of the second reagent from the second reagent container 25 transferred to a preset suction position, and then pours the sucked second reagent into the reaction container 26 transferred to a preset pouring position. The second reagent dispensing probe 13 is cleaned by a second reagent-dispensing-probe cleaning mechanism 34.

The first reaction-liquid stirring mechanism 14 inserts a stirring bar, which is not illustrated, into the reaction container 26 and stirs the diluted specimen and the first reagent. The second reaction-liquid stirring mechanism 15 inserts a stirring bar, which is not illustrated, into the reaction container 26 and stirs a liquid mixture of the diluted specimen, the first reagent, and the second reagent. The reaction-container cleaning mechanism 18 cleans the inside of the reaction container 26 after the completion of an analysis.

The multiwavelength photometer 16 conducts an optical measurement (colorimetric measurement) on the liquid mixture of the diluted specimen, which has reacted with the first reagent and the second reagent, by using a lamp for emitting a light beam to the reaction container 26. The multiwavelength photometer 16 outputs the amounts of various components in the specimen as absorbances and detects the reaction state of the diluted specimen. Measurement data on the specimen in the multiwavelength photometer 16 is transmitted to the controller 30.

The thermostat 17 always keeps the temperatures of the reaction containers 26 provided in the reaction turntable 6.

The reader 20 reads identification information on the specimen. The reader 20 reads specimen IDs from bar codes attached to the sample container 21 and the insulating sample container 22 that are stored in the sample turntable 2. The bar code is an encoded specimen ID that is identification information on the specimen. The specimen ID is information for identifying the specimen. The reader 20 is, for example, a bar code reader. The identification information read by the reader 20 is transmitted to the controller 30. Thus, the specimen and the diluent that are stored in the sample containers 21 and the insulating sample containers 22 can be managed by the controller 30.

1.2. Configuration of Controller

Figure 2:
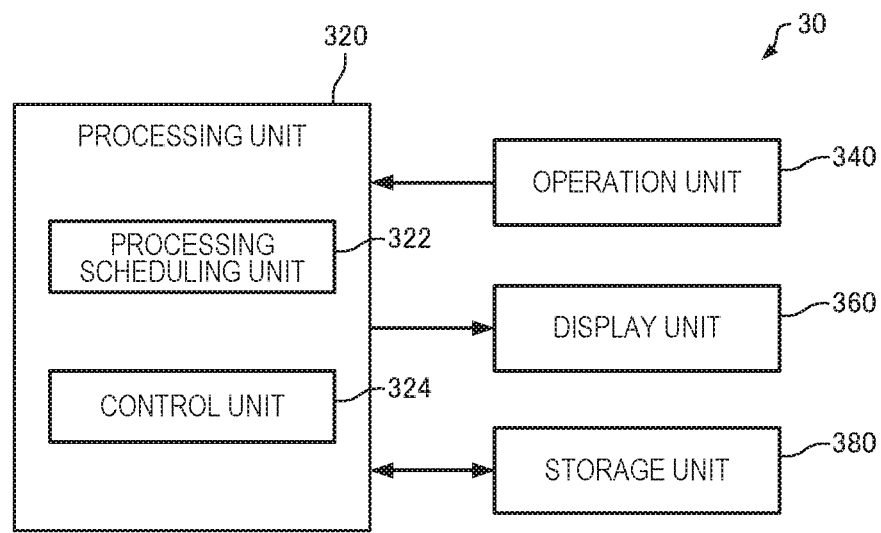
FIG. 2 illustrates the configuration of a controller.

FIG. 2 illustrates the configuration of the controller 30. As illustrated in FIG. 2, the controller 30 includes a processing unit 320, an operation unit 340, a display unit 360, and a storage unit 380.

The operation unit 340 performs processing for acquiring an operation signal corresponding to a user operation and transmitting the signal to the processing unit 320. The operation unit 340 can be implemented by an input device, e.g., a button, a key, a touch panel display, or a microphone.

The display unit 360 outputs an image generated by the processing unit 320. The display unit 360 can be implemented by a display, e.g., a liquid crystal display (LCD).

In the storage unit 380, programs and data for various kinds of calculation and control by the processing unit 320 are stored. The storage unit 380 is also used as a work area of the processing unit 320. The storage unit 380 can be implemented by, for example, random access memory (RAM), read only memory (ROM), or a hard disk.

The measurement items of specimens are stored in the storage unit 380. The measurement items of specimens may be acquired from a host computer, which is not illustrated.

In the storage unit 380, measurement data is stored as the measurement results of specimens. For example, measurement data on the specimen in the multiwavelength photometer 16 is transmitted to the controller 30 and is stored in the storage unit 380.

The processing unit 320 performs processing for controlling the parts of the automated analyzer 100 and acquiring measurement data on the specimen. The functions of the processing unit 320 can be implemented by executing programs by means of various processors (including a central processing unit (CPU)). At least some of the functions of the processing unit 320 may be implemented by a dedicated circuit, e.g., an ASIC (a gate array). The processing unit 320 includes a processing scheduling unit 322 and a control unit 324.

The processing scheduling unit 322 arranges a processing schedule for each specimen. For example, when the reader 20 reads a specimen ID, the processing scheduling unit 322 reads, from the storage unit 380, measurement item information on a specimen corresponding to the specimen ID. The processing scheduling unit 322 arranges a processing schedule for the specimen based on the acquired measurement item information. The processing schedule for the specimen is a schedule for processing on the specimen by the analysis unit 10. Specifically, the processing scheduling unit 322 determines processing to be performed on the specimen in the parts constituting the analysis unit 10, and arranges a schedule for the processing.

The control unit 324 operates the parts constituting the automated analyzer 100 based on the processing schedule for the specimen. Thus, a measurement (inspection) is conducted according to the measurement item of the specimen in the analysis unit 10. Specimen measurement data obtained in the analysis unit 10 is transmitted to the control unit 324. The control unit 324 stores the acquired measurement data in the storage unit 380.

Figure 3:
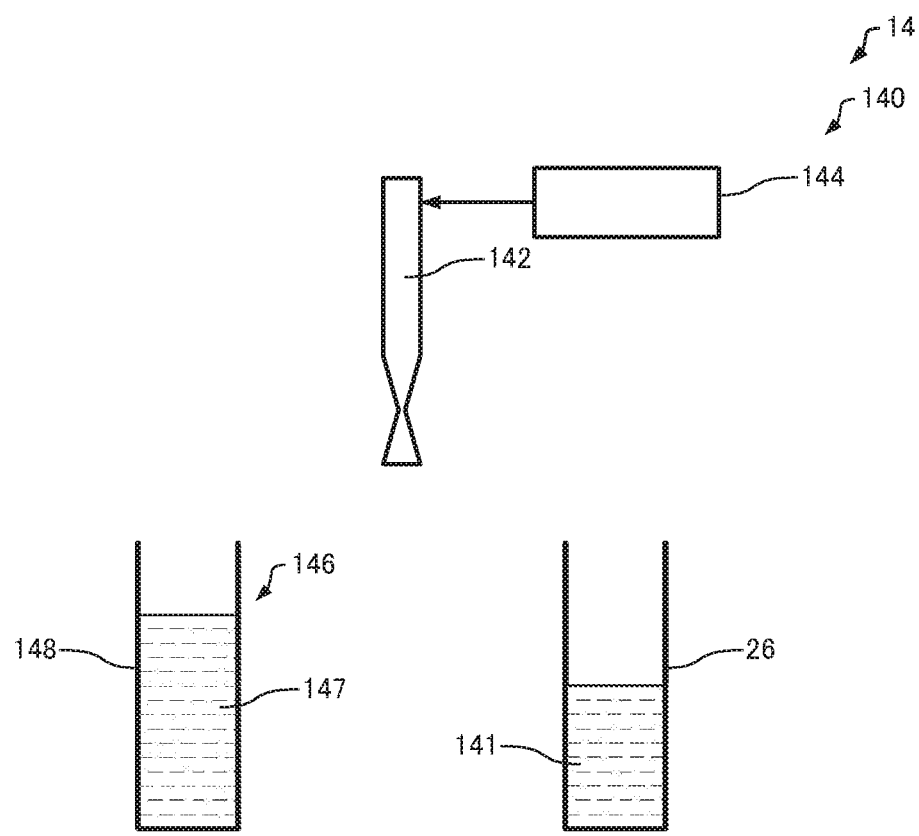
FIG. 3 is a diagram illustrating the configuration of a first reaction-liquid stirring mechanism.

2. First Reaction-Liquid Stirring Mechanism 2.1. Configuration of First Reaction-Liquid Stirring Mechanism FIG. 3 is a diagram illustrating the configuration of the first reaction-liquid stirring mechanism 14. As illustrated in FIG. 3, the first reaction-liquid stirring mechanism 14 includes a stirring part 140 having a stirring bar 142 and a stirring-bar cleaning mechanism 146 (an example of a cleaning part) for cleaning the stirring bar 142.

The stirring part 140 includes the stirring bar 142 and a stirring-bar drive mechanism 144 for moving the stirring bar 142. The stirring bar 142 is inserted into the reaction container 26 and stirs the diluted specimen and the first reagent.

The stirring-bar drive mechanism 144 moves the stirring bar 142 between the stirring-bar cleaning mechanism 146 (cleaning bath 148) and the reaction container 26 located at the stirring position. Furthermore, the stirring-bar drive mechanism 144 causes the stirring bar 142 to perform a stirring operation. For example, the stirring-bar drive mechanism 144 can move the stirring bar 142 in a horizontal direction and a vertical direction or rotate the stirring bar 142. The stirring-bar drive mechanism 144 includes a mechanism for pivoting an arm to which the stirring bar 142 is attached and a mechanism for vertically moving the stirring bar 142. The stirring bar 142 is moved by operating these mechanisms.

The stirring-bar cleaning mechanism 146 has the cleaning bath 148 containing a cleaning liquid 147. In the stirring-bar cleaning mechanism 146, the stirring bar 142 is cleaned by immersion in the cleaning liquid 147 contained in the cleaning bath 148. The cleaning liquid 147 is, for example, pure water or water containing various detergents.

2.2. Operations of First Reaction-Liquid Stirring Mechanism

Figure 4:
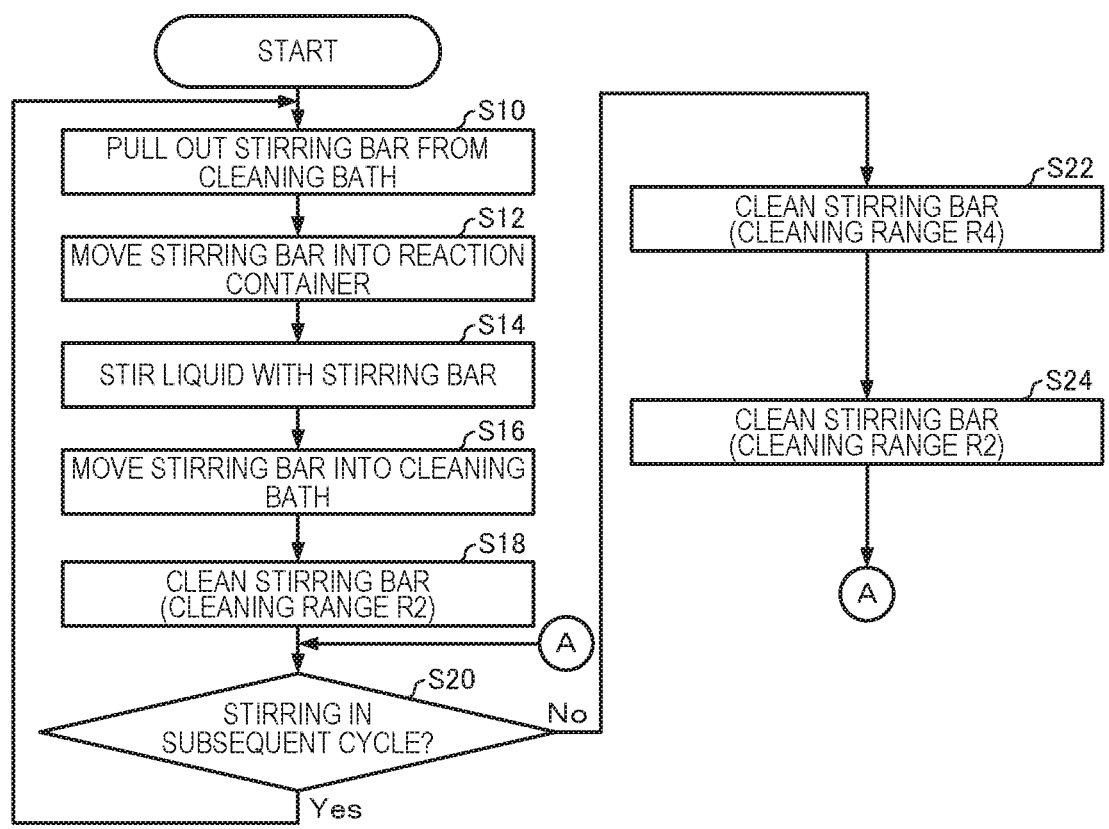
FIG. 4 is a flowchart illustrating an example of the operations of the first reaction-liquid stirring mechanism.
Figure 5:
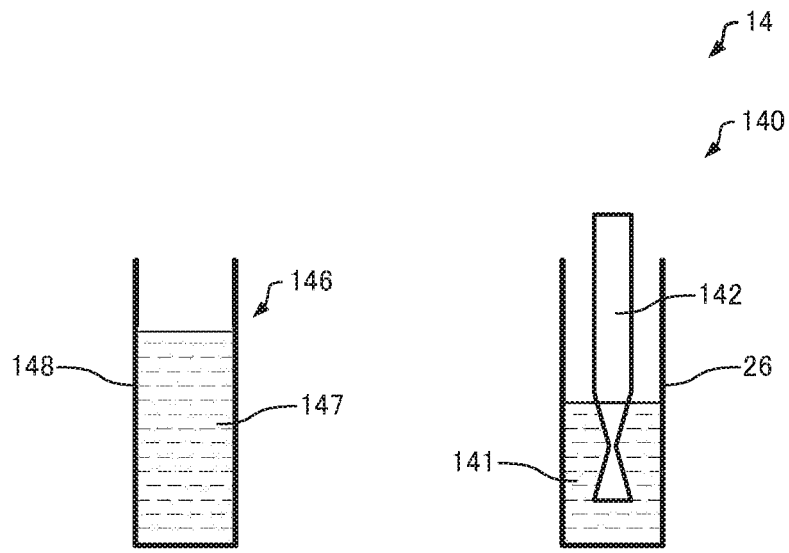
FIG. 5 is a diagram illustrating the operations of the first reaction-liquid stirring mechanism.
Figure 6:
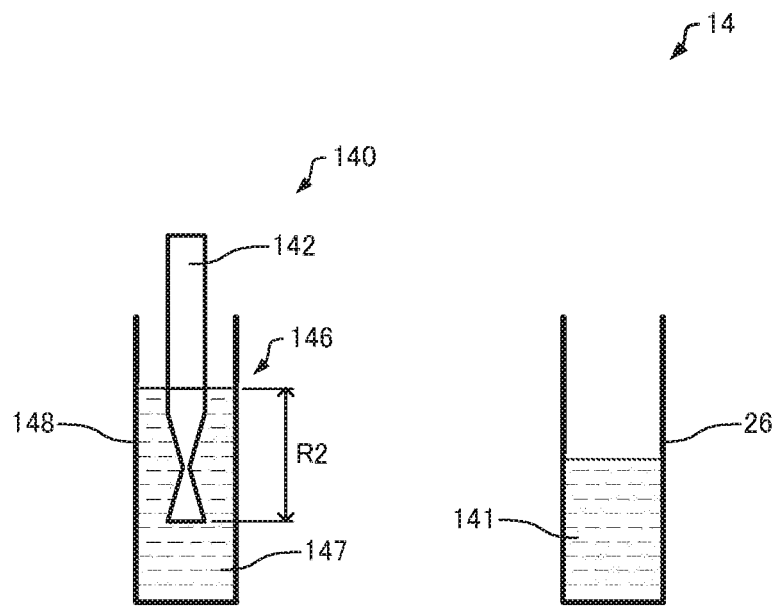
FIG. 6 is a diagram illustrating the operations of the first reaction-liquid stirring mechanism.
Figure 7:
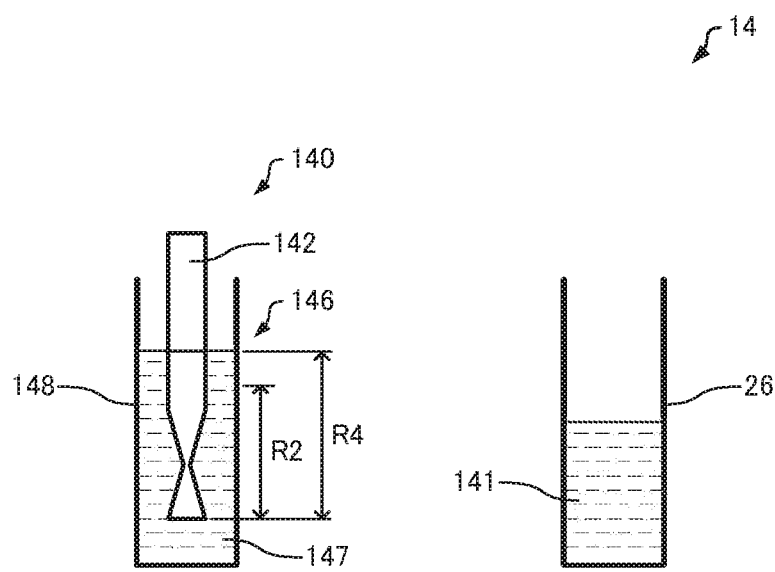
FIG. 7 is a diagram illustrating the operations of the first reaction-liquid stirring mechanism.

FIG. 4 is a flowchart illustrating an example of the operations of the first reaction-liquid stirring mechanism 14. FIGS. 5 to 7 are diagrams illustrating the operations of the first reaction-liquid stirring mechanism 14. In FIGS. 5 to 7, only the stirring bar 142, the reaction container 26, and the cleaning bath 148 are illustrated for convenience. In the following explanation, the automated analyzer 100 operates in the order of a first cycle, a second cycle, and a third cycle.

In the first cycle, as illustrated in FIG. 3, the reaction turntable 6 moves the reaction container 26, which contains the dispensed first reagent and diluted specimen, to the stirring position. In the meanwhile, the stirring-bar drive mechanism 144 pulls out the stirring bar 142 from the cleaning bath 148, completing the cleaning of the stirring bar 142 (S10).

As illustrated in FIG. 5, the stirring-bar drive mechanism 144 moves the stirring bar 142 into the reaction container 26 (S12) and then the stirring bar 142 stirs a liquid 141 in the reaction container 26, that is, the diluted specimen and the first reagent (S14).

As illustrated in FIG. 6, the stirring-bar drive mechanism 144 moves the stirring bar 142 from the reaction container 26 into the cleaning bath 148 (S16). The stirring-bar drive mechanism 144 immerses the stirring bar 142 into the cleaning liquid 147 and cleans the stirring bar 142 (S18).

When the stirring bar 142 is cleaned by the immersion in the cleaning liquid 147, the stirring bar 142 may be vertically or horizontally moved in the cleaning liquid 147.

In the cleaning operation of step (S18), a cleaning range R2 (an example of a first range) of the stirring bar 142 is cleaned. The cleaning range R2 is set wider than a range where the stirring bar 142 is in contact with the liquid 141 in the reaction container 26, that is, above the range in contact with the liquid 141. The cleaning range of the stirring bar 142 is a range where the stirring-bar cleaning mechanism 146 cleans the stirring bar 142. For example, when the stirring bar 142 is immersed in the cleaning liquid 147 and is cleaned therein, the cleaning range of the stirring bar 142 is the range of immersion of the stirring bar 142 in the cleaning liquid 147.

As described above, in the first cycle, the stirring bar 142 is pulled out of the cleaning bath 148 (S10), the stirring bar 142 is moved into the reaction container 26 (S12), the stirring operation is performed (S14), the stirring bar 142 is moved into the cleaning bath 148 (S16), and the cleaning operation is performed (S18). In other words, in one cycle time, the stirring bar 142 is pulled out of the cleaning bath 148 (S10), the stirring bar 142 is moved into the reaction container 26 (S12), the stirring operation is performed (S14), the stirring bar 142 is moved into the cleaning bath 148 (S16), and the cleaning operation is performed (S18).

When a stirring operation is performed in a subsequent cycle, that is, in the second cycle (Yes at S20), the reaction turntable 6 moves another reaction container 26, which is different from that in the first cycle, to the stirring position, the stirring bar 142 is pulled out of the cleaning bath 148 (S10), the stirring bar 142 is moved into the reaction container 26 (S12), the stirring operation is performed (S14), the stirring bar 142 is moved into the cleaning bath 148 (S16), and the cleaning operation is performed (S18).

When a stirring operation is not performed in the second cycle (No at S20), as illustrated in FIG. 7, the stirring-bar drive mechanism 144 cleans a cleaning range R4 (an example of a second range) that is wider than the cleaning range R2 of the cleaning operation (S18) for the stirring operation of the subsequent cycle (S22).

In the cleaning operation of the step (S22), the cleaning range R4 wider than the cleaning range R2 is cleaned on the stirring bar 142. In other words, the cleaning range R4 of the stirring bar 142 is immersed into the cleaning liquid 147.

After the cleaning of the cleaning range R4 of the stirring bar 142, the cleaning range R2 of the stirring bar 142 is cleaned (S24). The cleaning range R2 of the stirring bar 142 is cleaned as in the cleaning operation (S18).

As described above, when a stirring operation is not performed in the second cycle, the cleaning range R4 is cleaned (S22) and the cleaning range R2 is cleaned (S24) in the second cycle. The cleaning range R4 of the stirring bar 142 (S22) is cleaned in, for example, a time for performing step S10, step S12, step S14, and step S16. When a stirring operation is not performed in the second cycle, only the cleaning range R4 may be cleaned (S22) in the second cycle.

After the cleaning operation (S24), when a stirring operation is not performed in the subsequent cycle, that is, the third cycle (No at S20), the stirring-bar drive mechanism 144 performs the cleaning operation (S22) and the cleaning operation (S24). In other words, when a stirring operation is not performed in the second cycle and the third cycle, the cleaning operation (S22) and the cleaning operation (S24) are repeated in the second cycle and the third cycle.

When a stirring operation is performed in a subsequent cycle, that is, in the third cycle (Yes at S20), the reaction turntable 6 moves another reaction container 26, which is different from that in the second cycle, to the stirring position, the stirring bar 142 is pulled out of the cleaning bath 148 (S10), the stirring bar 142 is moved into the reaction container 26 (S12), the stirring operation is performed (S14), the stirring bar 142 is moved into the cleaning bath 148 (S16), and the cleaning operation is performed (S18).

In the automated analyzer 100, the operations (S10, S12, S14, S16, S18, S20, S22, S24) are repeated to analyze the specimen.

In the above explanation, the cleaning operation (S22) and the cleaning operation (S24) are repeated until the stirring operation is performed in the subsequent cycle. For example, when the cleaning operation (S22) and the cleaning operation (S24) have been repeated the number of times equal to a preset number of cycles, the stirring part 140 may be placed on standby without performing the cleaning operation (S22) and the cleaning operation (S24).

2.3. Processing

Figure 8:
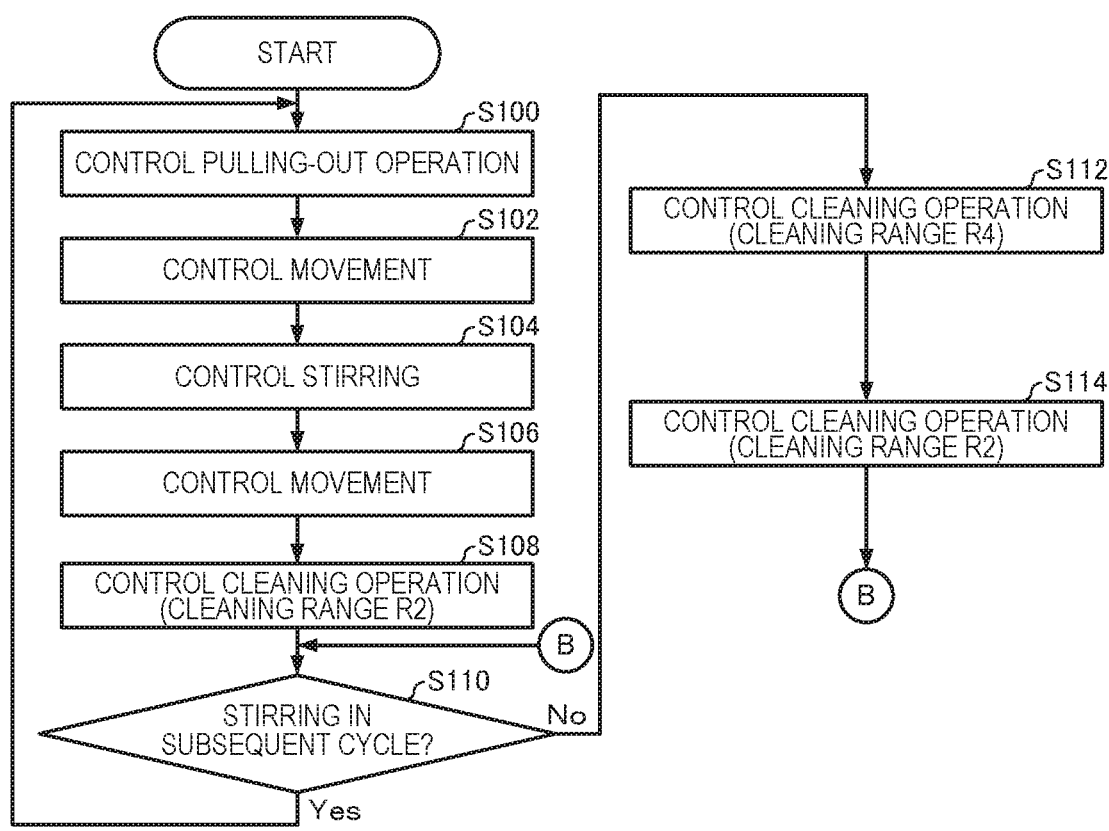
FIG. 8 is a flowchart illustrating an example of the processing of a control unit.

FIG. 8 is a flowchart illustrating an example of the processing of the control unit 324. Processing for controlling the first reaction-liquid stirring mechanism 14 by the control unit 324 will be described below. In the following explanation, the automated analyzer 100 operates in the order of a first cycle, a second cycle, and a third cycle.

As illustrated in FIG. 3, the control unit 324 controls the stirring-bar drive mechanism 144 so as to pull out the stirring bar 142 from the cleaning bath 148 (S100).

As illustrated in FIG. 5, the control unit 324 then controls the stirring-bar drive mechanism 144 so as to move the stirring bar 142 into the reaction container 26 (S102). Subsequently, the control unit 324 controls the stirring-bar drive mechanism 144 so as to stir the liquid 141 in the reaction container 26 with the stirring bar 142 (S104).

As illustrated in FIG. 6, the control unit 324 then controls the stirring-bar drive mechanism 144 so as to immerse the cleaning range R2 of the stirring bar 142 into the cleaning liquid 147 (S108). This cleans the cleaning range R2 of the stirring bar 142.

The processing in step S100, step S102, step S104, step S106, and step S108 is performed in one cycle, completing the first cycle.

Based on information on the measurement schedules of specimens, the control unit 324 determines whether a stirring operation is to be performed by the stirring part 140 in the subsequent cycle, that is, the second cycle (S110).

As described above, when the reader 20 reads the specimen ID, the processing scheduling unit 322 arranges a schedule for the specimen based on measurement item information on the specimen corresponding to the specimen ID. The control unit 324 determines whether a stirring operation is to be performed by the stirring part 140 in the second cycle, based on the processing schedule of the specimen.

For example, from the processing schedules of specimens, the control unit 324 checks the presence or absence of the specimen in the reaction container 26 located at a stirring position in the second cycle. In the absence of the specimen in the reaction container 26 located at the stirring position, the control unit 324 determines that a stirring operation is not to be performed by the stirring part 140 in the second cycle. In the presence of the specimen in the reaction container 26 located at the stirring position in the second cycle, the control unit 324 checks whether stirring is necessary for the specimen based on the processing schedule of the specimen in the reaction container 26. When stirring is necessary, the control unit 324 determines that a stirring operation is to be performed by the stirring part 140. When stirring is not necessary for the specimen, the control unit 324 determines that a stirring operation is not to be performed by the stirring part 140.

When the control unit 324 determines that a stirring operation is to be performed by the stirring part 140 (Yes at S110), the processing of step S100, step S102, step S104, step S106, and step S108 is performed. This can stir the liquid in the reaction container 26 located at the stirring position in the second cycle.

When the control unit 324 determines that a stirring operation is not to be performed by the stirring part 140 (No at S110), as illustrated in FIG. 7, the control unit 324 controls the stirring-bar drive mechanism 144 so as to immerse the cleaning range R4 of the stirring bar 142 into the cleaning liquid 147 (S112). Thus, the cleaning range R4 of the stirring bar 142 is cleaned. The control unit 324 then controls the stirring-bar drive mechanism 144 so as to immerse the cleaning range R2 of the stirring bar 142 into the cleaning liquid 147 (S114), and determines whether a stirring operation is to be performed by the stirring part 140 in a subsequent cycle, that is, the third cycle based on the information on the measurement schedules of specimens (S110).

When the control unit 324 determines that a stirring operation is not to be performed by the stirring part 140 (No at S110), the control unit 324 controls the stirring-bar drive mechanism 144 in the second cycle so as to immerse the cleaning range R4 of the stirring bar 142 into the cleaning liquid 147 (S112). Processing in step S114 is not required.

The control unit 324 repeats the processing of step S100, step S102, step S104, step S106, step S108, step S110, step S112, and step S114.

Figure 9:
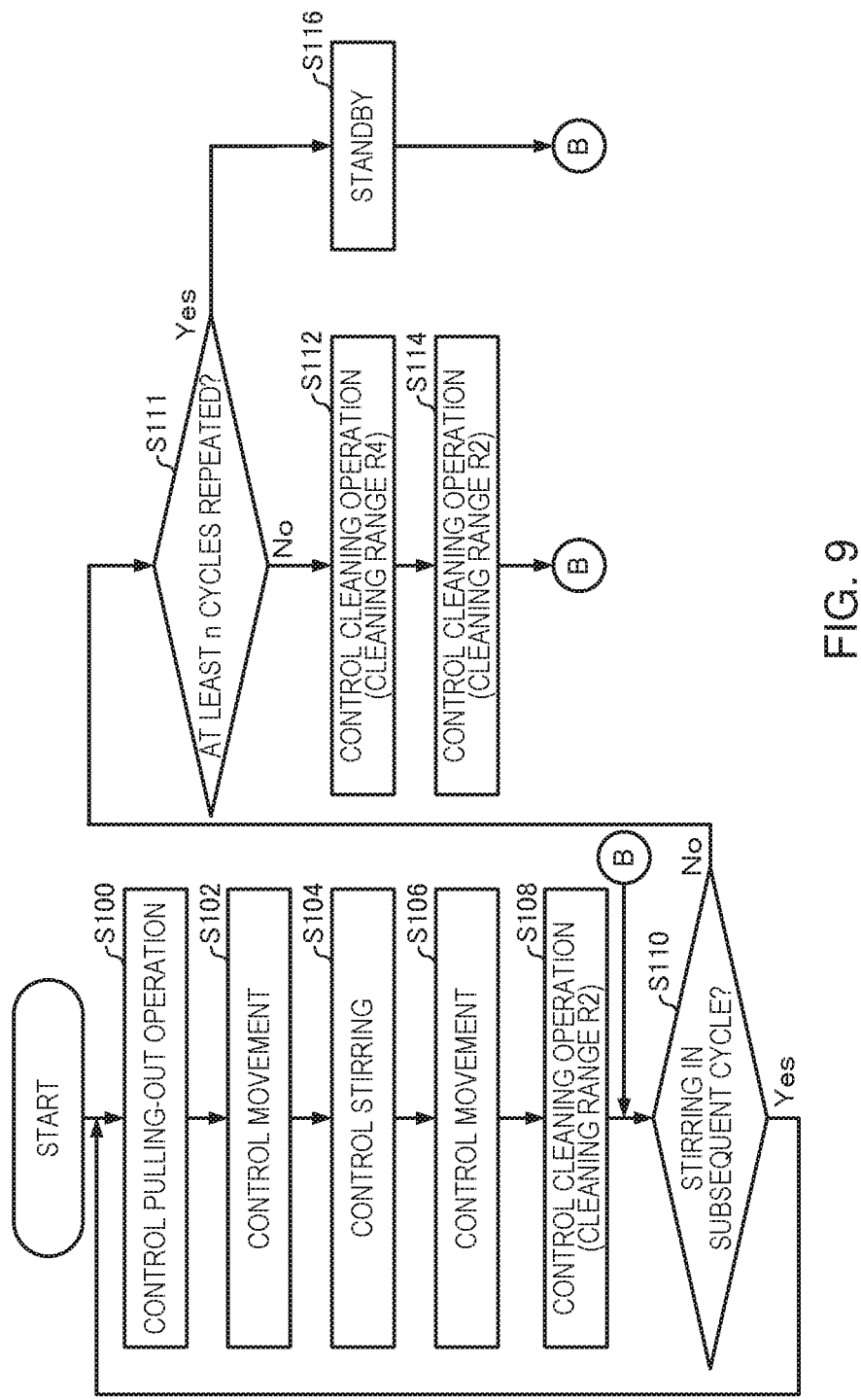
FIG. 9 is a flowchart illustrating a modification of the processing of the control unit.

FIG. 9 is a flowchart illustrating a modification of the processing of the control unit 324. Differences from the processing of the control unit 324 in FIG. 8 will be described below and an explanation is omitted for processing similar to that of the control unit 324 in FIG. 8.

As indicated in FIG. 9, before controlling the stirring-bar drive mechanism 144 so as to immerse the cleaning range R4 of the stirring bar 142 into the cleaning liquid 147 (S112), the control unit 324 determines whether at least n cycles of the processing (S112) have been repeated or not (S111). "n" can be set at any integral. When the control unit 324 determines that at least n cycles of the processing have not been repeated (No at S111), the control unit 324 controls the stirring-bar drive mechanism 144 so as to immerse the cleaning range R4 of the stirring bar 142 into the cleaning liquid 147 (S112). The control unit 324 then controls the stirring-bar drive mechanism 144 so as to immerse the cleaning range R2 of the stirring bar 142 into the cleaning liquid 147 (S114), and determines whether a stirring operation is to be performed by the stirring part 140 in the subsequent cycle based on the information on the measurement schedules of specimens (S110).

When it is determined that at least n cycles of the processing (S112) have been repeated (Yes at S111), the control unit 324 places the stirring part 140 on standby until it is determined that a stirring operation is to be performed in the subsequent cycle (S116). For example, the control unit 324 controls the stirring-bar drive mechanism 144 so as to continuously immerse the cleaning range R2 of the stirring bar 142 into the cleaning liquid 147. The stirring part 140 is placed on standby until it is determined that a stirring operation is to be performed in the subsequent cycle. Based on information on the measurement schedules of specimens, the control unit 324 determines whether a stirring operation is to be performed by the stirring part 140 in the subsequent cycle (S110). As described above, when at least n cycles of the processing (S112) have been repeated, the control unit 324 repeats the processing of step S116 and the processing of step S110 until it is determined that a stirring operation is to be performed by the stirring part 140 in the subsequent cycle.

In the explanation, in step S116, the stirring part 140 is placed on standby while the stirring bar 142 is immersed in the cleaning liquid 147. The stirring-bar drive mechanism 144 may be controlled so as to pull out the stirring bar 142 from the cleaning bath 148 in step S116, so that the stirring part 140 may be placed on standby with the stirring bar 142 pulled out of the cleaning bath 148.

3. Dispensing Unit 3.1. Configuration of Dispensing Unit

Figure 10:
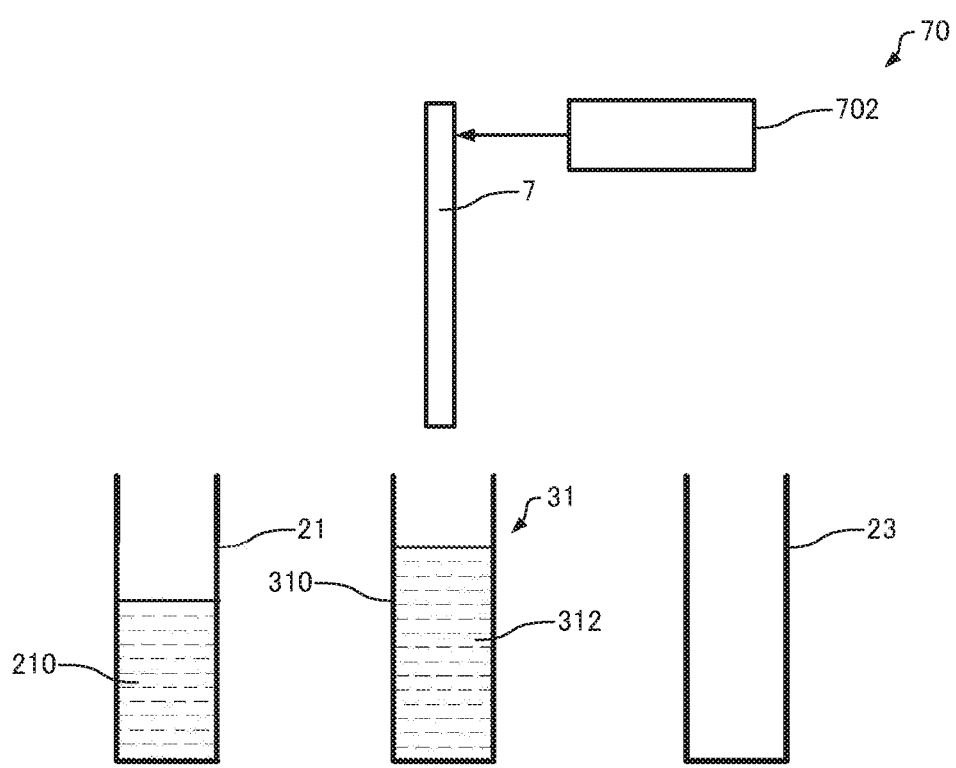
FIG. 10 is a diagram illustrating the configuration of a dispensing unit.

FIG. 10 is a diagram illustrating the configuration of a dispensing unit 70. The automated analyzer 100 includes the dispensing unit 70. As illustrated in FIG. 10, the dispensing unit 70 includes the original-specimen sampling probe 7 and an original-specimen sampling probe drive mechanism 702. As described above, the automated analyzer 100 further includes the original-specimen sampling probe cleaning mechanism 31 (an example of a cleaning part).

The original-specimen sampling probe 7 sucks a liquid, e.g., a specimen or a detergent from the sample container 21 or the insulating sample container 22 and pours a sucked specimen 210 and a diluent into the dilution container 23 transferred to the pouring position.

The original-specimen sampling probe drive mechanism 702 moves the original-specimen sampling probe 7. The original-specimen sampling probe drive mechanism 702 moves the original-specimen sampling probe 7 among the sample container 21 at the suction position, the dilution container 23 at the pouring position, and a cleaning bath 310. Moreover, the original-specimen sampling probe drive mechanism 702 causes the original-specimen sampling probe 7 to suck the specimen 210 and pour the specimen 210. The original-specimen sampling probe drive mechanism 702 includes a mechanism for pivoting the arm to which the original-specimen sampling probe 7 is attached and a mechanism for vertically moving the original-specimen sampling probe 7. The original-specimen sampling probe 7 is moved by operating these mechanisms. The original-specimen sampling probe drive mechanism 702 further includes a dispensing mechanism for causing the original-specimen sampling probe 7 to perform a sucking operation and a pouring operation. The original-specimen sampling probe 7 is caused to perform a sucking operation and a pouring operation by operating the dispensing mechanism.

The original-specimen sampling probe cleaning mechanism 31 includes the cleaning bath 310 containing a cleaning liquid 312. In the original-specimen sampling probe cleaning mechanism 31, the original-specimen sampling probe 7 is cleaned by immersion in the cleaning liquid 312 contained in the cleaning bath 310.

3.2. Operations of Dispensing Unit

Figure 11:
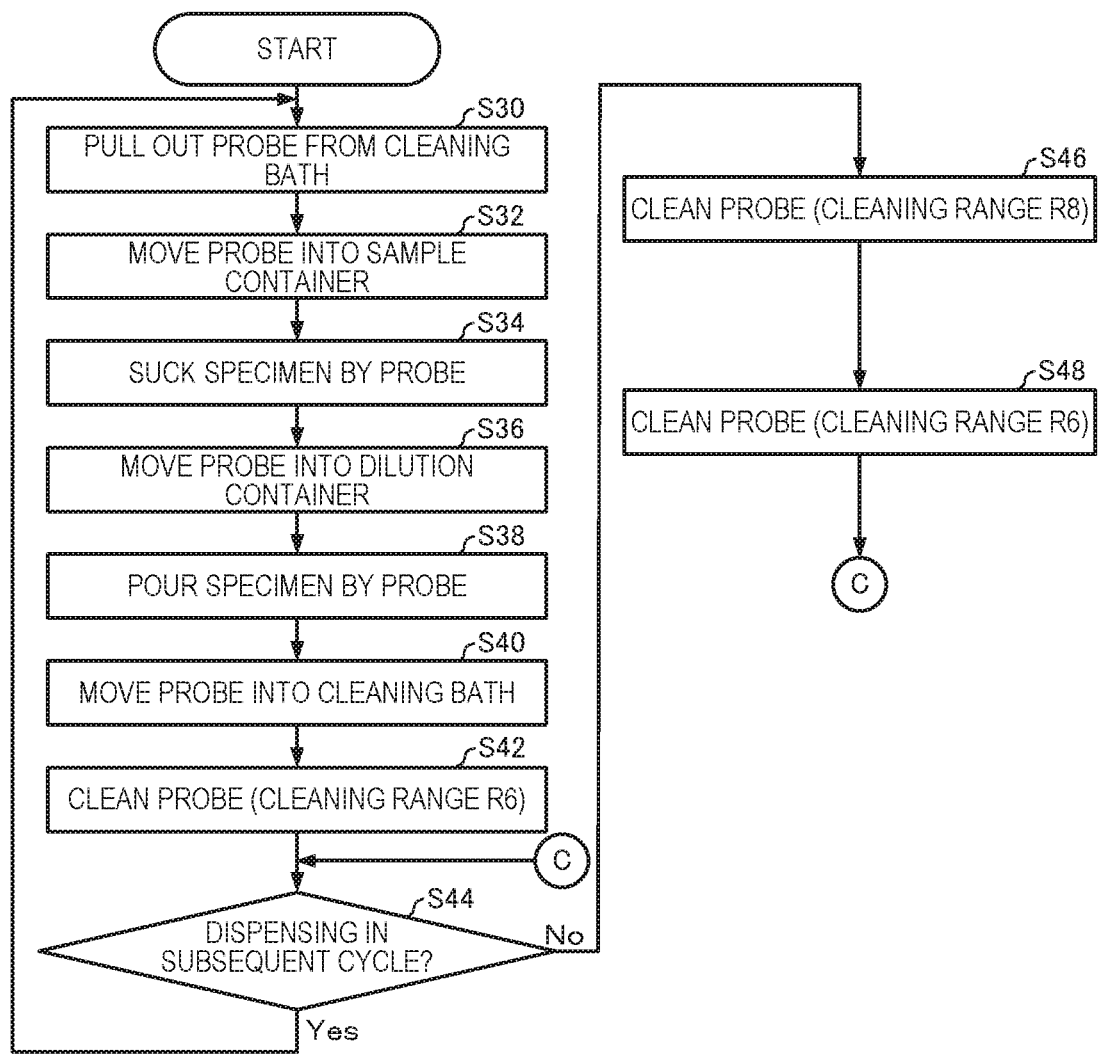
FIG. 11 is a flowchart illustrating an example of the operations of the dispensing unit.

FIG. 11 is a flowchart illustrating an example of the operations of the dispensing unit 70. FIGS. 12 to 15 are diagrams illustrating the operations of the dispensing unit 70. In FIGS. 12 to 15, only the original-specimen sampling probe 7, the original-specimen sampling probe drive mechanism 702, and the original-specimen sampling probe cleaning mechanism 31 are illustrated for convenience. In the following explanation, the automated analyzer 100 operates in the order of a first cycle, a second cycle, and a third cycle.

In the first cycle, as illustrated in FIG. 10, the sample turntable 2 moves the sample container 21, which contains the specimen, to the suction position. The dilution turntable 3 moves the dilution container 23 to the pouring position. In parallel with the operation, the original-specimen sampling probe drive mechanism 702 pulls out the original-specimen sampling probe 7 from the cleaning bath 310, completing the cleaning of the original-specimen sampling probe 7 (S30).

Figure 12:
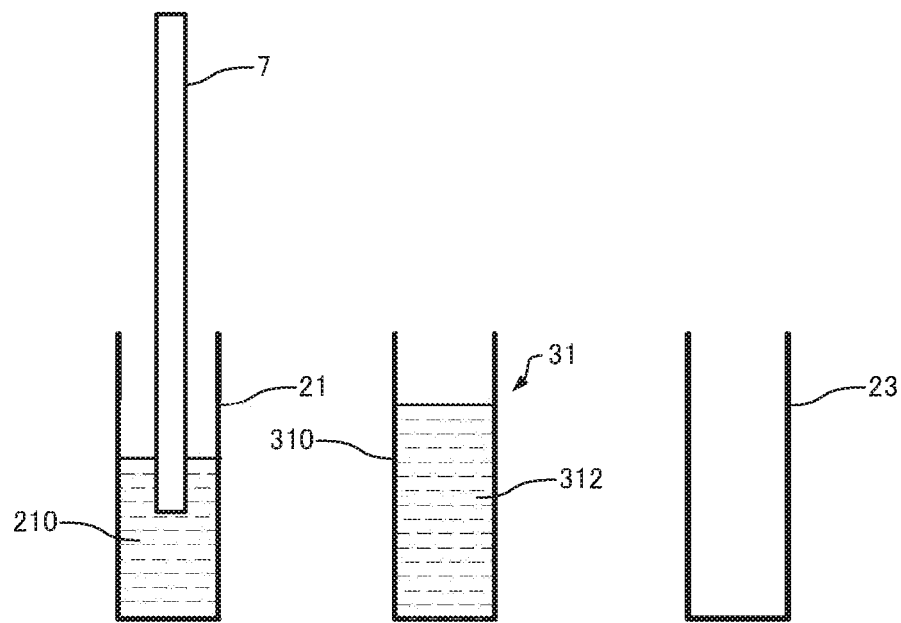
FIG. 12 is a diagram illustrating the operations of the dispensing unit.

As illustrated in FIG. 12, the original-specimen sampling probe drive mechanism 702 moves the original-specimen sampling probe 7 into the sample container 21 located at the suction position (S32) and causes the original-specimen sampling probe 7 to suck the specimen 210 in the sample container 21 (S34).

Figure 13:
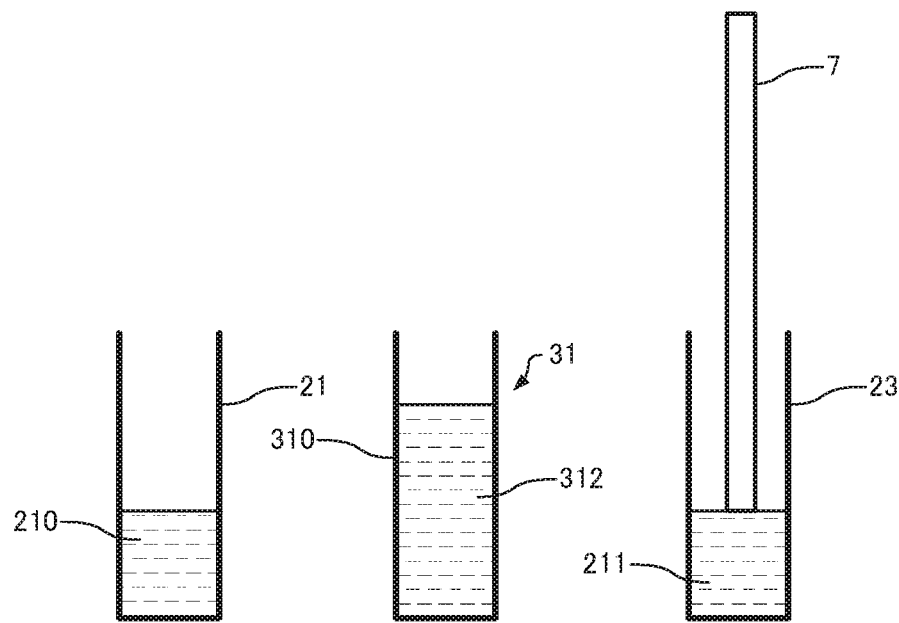
FIG. 13 is a diagram illustrating the operations of the dispensing unit.

As illustrated in FIG. 13, the original-specimen sampling probe drive mechanism 702 moves the original-specimen sampling probe 7 into the dilution container 23 located at the pouring position (S36) and causes the original-specimen sampling probe 7 to pour the diluted specimen 211 (S38).

Figure 14:
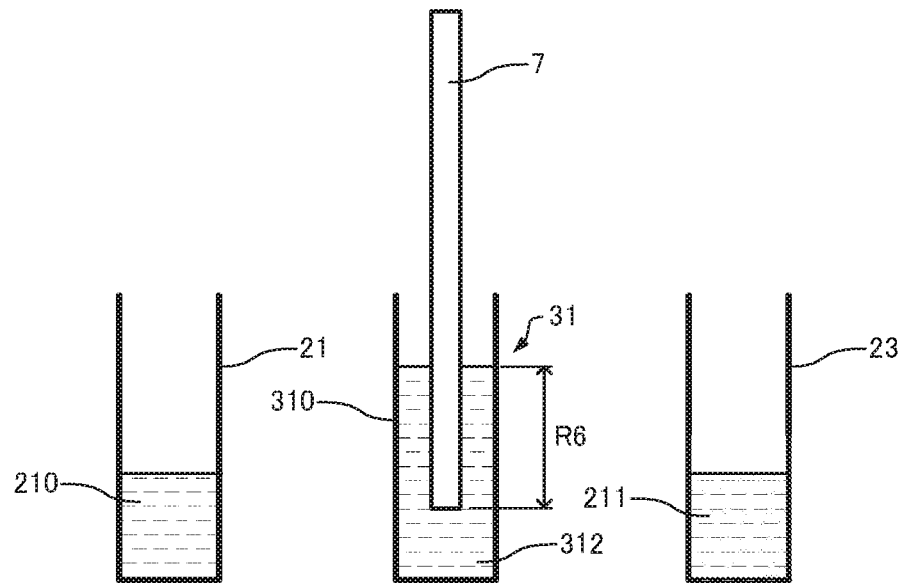
FIG. 14 is a diagram illustrating the operations of the dispensing unit.

As illustrated in FIG. 14, the original-specimen sampling probe drive mechanism 702 moves the original-specimen sampling probe 7 from the dilution container 23 into the cleaning bath 310 (S40).

The original-specimen sampling probe drive mechanism 702 immerses the original-specimen sampling probe 7 into the cleaning liquid 312 and cleans the original-specimen sampling probe 7 (S42). At this point, a cleaning range R6 (an example of the first range) of the original-specimen sampling probe 7 is cleaned. The cleaning range R6 is set wider than a range where the original-specimen sampling probe 7 is in contact with the specimen 210 in the sample container 21, that is, above a range in contact with the specimen 210.

As described above, in the first cycle, the original-specimen sampling probe 7 is pulled out of the cleaning bath 310 (S30), the original-specimen sampling probe 7 is moved into the sample container 21 (S32), a sucking operation is performed (S34), the original-specimen sampling probe 7 is moved into the dilution container 23 (S36), a dispensing operation is performed (S38), the original-specimen sampling probe 7 is moved into the cleaning bath 310 (S40), and a cleaning operation is performed (S42).

When a dispensing operation is performed in the subsequent cycle, that is, in the second cycle (Yes at S44), the sample turntable 2 moves another sample container 21, which is different from that in the first cycle, to the suction position, the dilution turntable 3 moves another dilution container 23, which is different from that in the first cycle, to the pouring position, the original-specimen sampling probe 7 is pulled out of the cleaning bath 310 (S30), the original-specimen sampling probe 7 is moved into the sample container 21 (S32), a sucking operation is performed (S34), the original-specimen sampling probe 7 is moved into the dilution container 23 (S36), a dispensing operation is performed (S38), the original-specimen sampling probe 7 is moved into the cleaning bath 310 (S40), and a cleaning operation is performed (S42).

Figure 15:
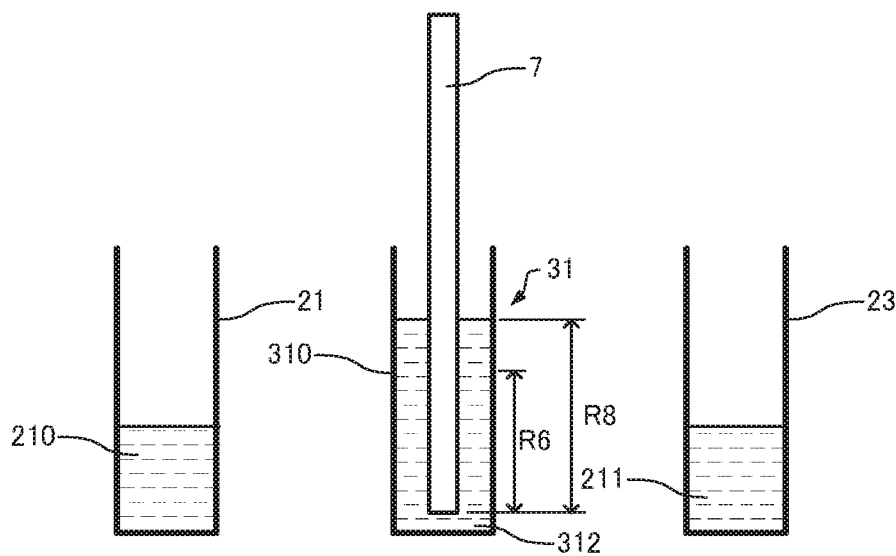
FIG. 15 is a diagram illustrating the operations of the dispensing unit.

When a dispensing operation is not performed in the second cycle (No at S44), as illustrated in FIG. 15, the original-specimen sampling probe drive mechanism 702 cleans a cleaning range R8 (an example of a second range) that is wider than the cleaning range R6 of the cleaning operation (S42) for the dispensing operation of the subsequent cycle (S46).

After the cleaning of the cleaning range R8 of the original-specimen sampling probe 7, the cleaning range R6 of the original-specimen sampling probe 7 is cleaned (S48). The cleaning range R6 of the original-specimen sampling probe 7 is cleaned as in the cleaning operation (S42).

When a dispensing operation is not performed in the second cycle, the cleaning range R8 is cleaned (S46) and the cleaning range R6 is cleaned (S48) in the second cycle. The cleaning range R8 of the original-specimen sampling probe 7 is cleaned (S46) in, for example, a time for performing step S30, step S32, step S34, step S36, step S38, and step S40. When the dispensing operation is not performed in the second cycle, only the cleaning range R8 may be cleaned (S46) in the second cycle.

After the cleaning operation (S48), when the dispending operation is not performed in the subsequent cycle, that is, the third cycle (No at S44), the original-specimen sampling probe drive mechanism 702 performs the cleaning operation (S46) and the cleaning operation (S48).

When a dispensing operation is performed in the subsequent cycle, that is, in the third cycle (Yes at S44), the sample turntable 2 moves another sample container 21, which is different from that in the second cycle, to the suction position, the dilution turntable 3 moves another dilution container 23, which is different from that in the second cycle, to the pouring position, the original-specimen sampling probe 7 is pulled out of the cleaning bath 310 (S30), the original-specimen sampling probe 7 is moved into the sample container 21 (S32), a sucking operation is performed (S34), the original-specimen sampling probe 7 is moved into the dilution container 23 (S36), a dispensing operation is performed (S38), the original-specimen sampling probe 7 is moved into the cleaning bath 310 (S40), and a cleaning operation is performed (S42).

In the explanation, the cleaning operation (S46) and the cleaning operation (S48) are repeated until the dispensing operation is performed in the subsequent cycle. For example, when the cleaning operation (S46) and the cleaning operation (S48) have been repeated the number of times equal to a preset number of cycles, the dispensing unit 70 may be placed on standby without performing the cleaning operation (S46) and the cleaning operation (S48).

3.3. Processing

Figure 16:
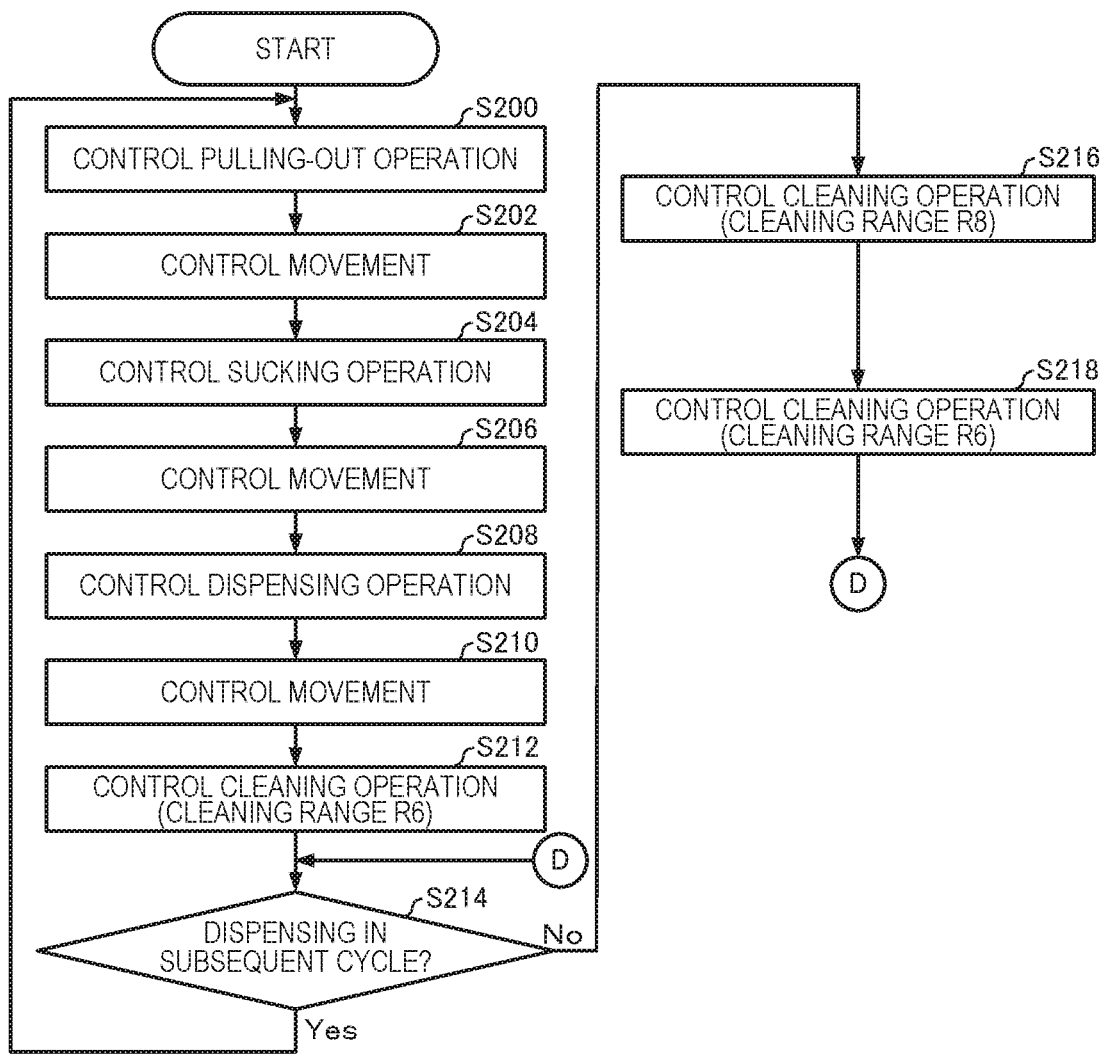
FIG. 16 is a flowchart illustrating an example of the processing of the control unit.

FIG. 16 is a flowchart illustrating an example of the processing of the control unit 324. Processing for controlling the original-specimen sampling probe drive mechanism 702 by the control unit 324 will be described below. In the following explanation, the automated analyzer 100 operates in the order of a first cycle, a second cycle, and a third cycle.

As illustrated in FIG. 10, the control unit 324 controls the original-specimen sampling probe drive mechanism 702 so as to pull out the original-specimen sampling probe 7 from the cleaning bath 310 (S200).

The control unit 324 then controls the original-specimen sampling probe drive mechanism 702 so as to move the original-specimen sampling probe 7 into the sample container 21 located at the suction position as illustrated in FIG. 12 (S202). Thereafter, the control unit 324 controls the original-specimen sampling probe drive mechanism 702 such that the original-specimen sampling probe 7 sucks the specimen 210 in the sample container 21 (S204).

The control unit 324 then controls the original-specimen sampling probe drive mechanism 702 so as to move the original-specimen sampling probe 7 into the dilution container 23 located at the pouring position as illustrated in FIG. 13 (S206). Thereafter, the control unit 324 controls the original-specimen sampling probe drive mechanism 702 such that the original-specimen sampling probe 7 pours the diluted specimen 211 into the dilution container 23 (S208). Thus, the diluted specimen 211 is dispensed into the dilution container 23.

As illustrated in FIG. 14, the control unit 324 controls the original-specimen sampling probe drive mechanism 702 so as to move the original-specimen sampling probe 7 from the dilution container 23 into the cleaning bath 310 (S210). The control unit 324 controls the original-specimen sampling probe drive mechanism 702 so as to immerse the cleaning range R6 of the original-specimen sampling probe 7 into the cleaning liquid 312 (S212). Thus, the cleaning range R6 of the original-specimen sampling probe 7 is cleaned.

The processing in step S200, step S202, step S204, step S206, step S208, step S210, and step S212 is performed in one cycle, completing the first cycle.

Based on information on the measurement schedules of specimens, the control unit 324 determines whether a dispensing operation is to be performed by the dispensing unit 70 in the subsequent cycle, that is, the second cycle (S214).

As described above, when the reader 20 reads the specimen ID, the processing scheduling unit 322 arranges a schedule for the specimen based on measurement item information on the specimen corresponding to the specimen ID. The control unit 324 determines whether a dispensing operation is to be performed by the original-specimen sampling probe 7, based on the processing schedule of the specimen.

For example, from the processing schedules of specimens, the control unit 324 checks the presence or absence of the sample container 21 located at the suction position in the second cycle. In the absence of the sample container 21 located at the suction position, the control unit 324 determines that a dispensing operation is not to be performed by the dispensing unit 70 in the second cycle. In the presence of the sample container 21 located at the suction position in the second cycle, the control unit 324 checks whether dispensing is necessary for the specimen based on the processing schedule of the specimen in the sample container 21. When dispensing is necessary, the control unit 324 determines that a dispensing operation is to be performed by the dispensing unit 70. When dispensing is not necessary for the specimen, the control unit 324 determines that a dispensing operation is not to be performed by the dispensing unit 70.

When the control unit 324 determines that a dispensing operation is to be performed by the dispensing unit 70 (Yes at S214), the processing of step S200, step S202, step S204, step S206, step S208, step S210, and step S212 is performed. Thus, the specimen in the sample container 21 located at the dispensing position in the second cycle can be dispensed into the dilution container 23.

When the control unit 324 determines that a dispensing operation is not to be performed by the dispensing unit 70 (No at S214), as illustrated in FIG. 15, the control unit 324 controls the original-specimen sampling probe drive mechanism 702 so as to immerse the cleaning range R8 of the original-specimen sampling probe 7 into the cleaning liquid 312 (S216). Thus, the cleaning range R8 of the original-specimen sampling probe 7 is cleaned. The control unit 324 then controls the original-specimen sampling probe drive mechanism 702 so as to immerse the cleaning range R6 of the original-specimen sampling probe 7 into the cleaning liquid 312 (S218), and determines whether a dispensing operation is to be performed by the dispensing unit 70 in a subsequent cycle, that is, the third cycle based on the information on the measurement schedule of the specimen (S214).

When the control unit 324 determines that a dispensing operation is not to be performed by the dispensing unit 70 (No at S214), the control unit 324 only controls the original-specimen sampling probe drive mechanism 702 so as to immerse the cleaning range R8 of the original-specimen sampling probe 7 into the cleaning liquid 312 in the second cycle (S216). Processing in step S218 is not necessary.

The control unit 324 repeats the processing of step S200, step S202, step S204, step S208, step S210, step S212, step S214, step S216, and step S218.

Figure 17:
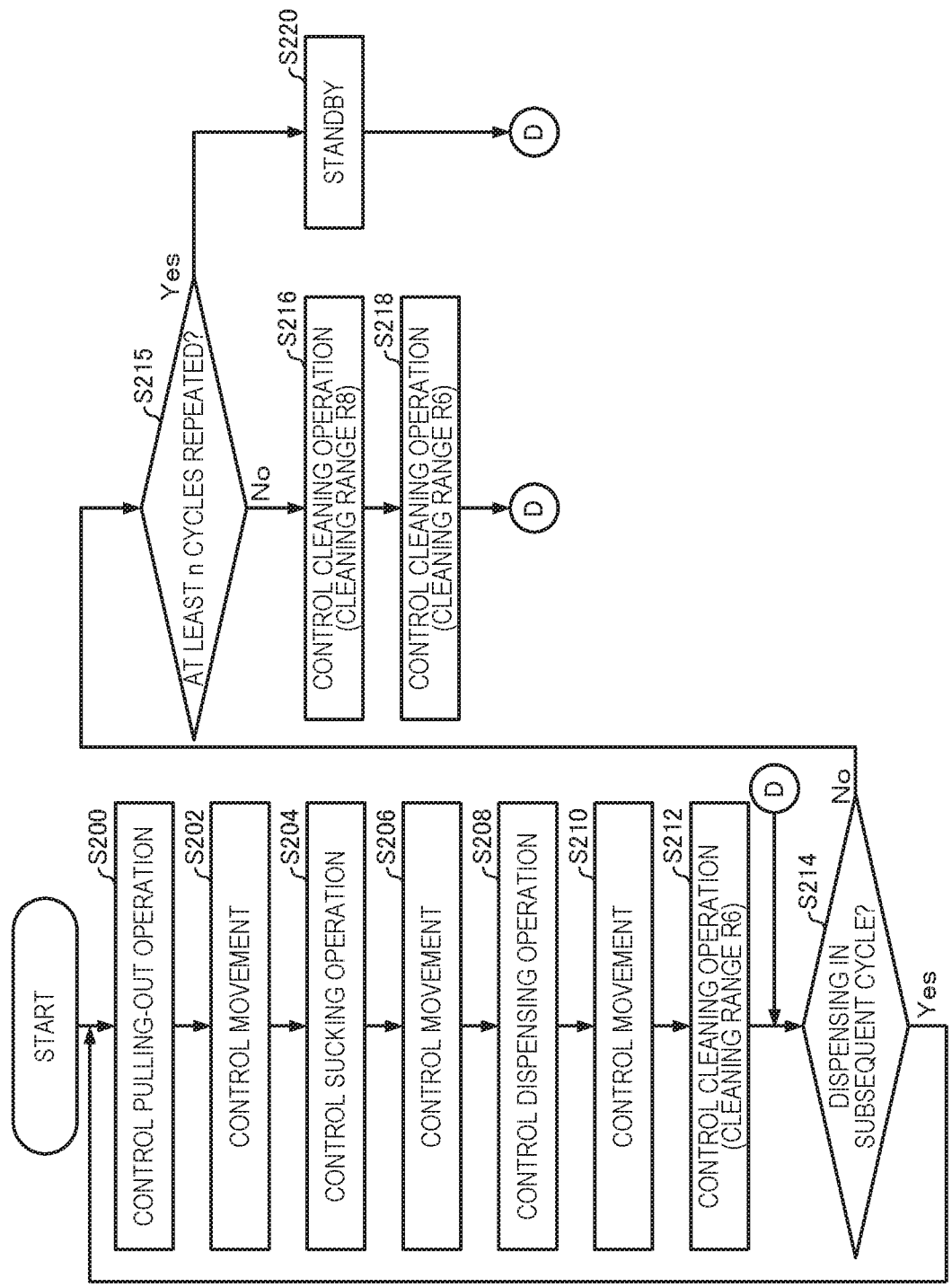
FIG. 17 is a flowchart illustrating a modification of the processing of the control unit.

FIG. 17 is a flowchart illustrating a modification of the processing of the control unit 324. Differences from the processing of the control unit 324 in FIG. 16 will be described below and an explanation is omitted for processing similar to that of the control unit 324 in FIG. 16.

As indicated in FIG. 17, before controlling the original-specimen sampling probe drive mechanism 702 so as to immerse the cleaning range R8 of the original-specimen sampling probe 7 into the cleaning liquid 312 (S216), the control unit 324 determines whether at least n cycles of the processing (S216) have been repeated or not (S215). "n" can be set at any integral. When the control unit 324 determines that at least n cycles of the processing have not been repeated (No at S215), the control unit 324 controls the original-specimen sampling probe drive mechanism 702 so as to immerse the cleaning range R8 of the original-specimen sampling probe 7 into the cleaning liquid 312 (S216). The control unit 324 then controls the original-specimen sampling probe drive mechanism 702 so as to immerse the cleaning range R6 of the original-specimen sampling probe 7 into the cleaning liquid 312 (S218), and determines whether a dispensing operation is to be performed by the dispensing unit 70 in the subsequent cycle based on the information on the measurement schedule of the specimen (S214).

When the control unit 324 determines that at least n cycles of the processing (S216) have been repeated (Yes at S215), the control unit 324 places the dispensing unit 70 on standby until it is determined that a dispensing operation is to be performed in the subsequent cycle (S220). For example, the control unit 324 controls the original-specimen sampling probe drive mechanism 702 so as to continuously immerse the cleaning range R6 of the original-specimen sampling probe 7 in the cleaning liquid 312. The dispensing unit 70 is placed on standby until it is determined that a dispending operation is to be performed in the subsequent cycle. Based on the information on the measurement schedule of the specimen, the control unit 324 determines whether a dispensing operation is to be performed by the dispensing unit 70 in the subsequent cycle (S214). As described above, when at least n cycles of the processing (S216) have been repeated, the control unit 324 repeats the processing of step S220 and the processing of step S214 until it is determined that a dispensing operation is to be performed by the dispensing unit 70 in the subsequent cycle.

In the explanation, in step S220, the dispensing unit 70 is placed on standby while the original-specimen sampling probe 7 is immersed in the cleaning liquid 312. The original-specimen sampling probe drive mechanism 702 may be controlled so as to pull out the original-specimen sampling probe 7 from the cleaning bath 310 in step S220, so that the dispensing unit 70 may be placed on standby with the original-specimen sampling probe 7 pulled out of the cleaning bath 310.

4. Cleaning Sequence

The measurement sequence for measuring the specimen was described above. The automated analyzer 100 performs a cleaning sequence for cleaning the parts of the analyzer by using a cleaning liquid instead of a specimen or a reagent in an operation flow similar to the measurement sequence.

The measurement sequence switches between the cleaning of the cleaning range R2 of the stirring bar 142 and the cleaning of the cleaning range R4 of the stirring bar 142 depending on the presence or absence of a stirring operation, whereas in the cleaning sequence, the cleaning range R4 of the stirring bar 142 is always cleaned. This is because in the measurement sequence, the cleaning liquid 147 on the stirring bar 142 may be disadvantageously mixed into the liquid 141 in the reaction container 26, as will be described later, whereas the cleaning sequence does not have such a problem.

Also regarding the original-specimen sampling probe 7, the cleaning range R8 of the original-specimen sampling probe 7 is always cleaned in the cleaning sequence.

5. Effects

The automated analyzer 100 includes the stirring part 140 for stirring the liquid in the reaction container 26 by the stirring bar 142, the stirring-bar cleaning mechanism 146 for cleaning the stirring bar 142, and the control unit 324 for controlling the stirring part 140 and the stirring-bar cleaning mechanism 146. The control unit 324 performs first processing for cleaning the cleaning range R2 of the stirring bar 142 in the second cycle when the liquid 141 is stirred by the stirring part 140 in the second cycle subsequent to the first cycle and second processing for cleaning the cleaning range R4 of the stirring bar 142 in the second cycle when the liquid 141 is not stirred by the stirring part 140 in the second cycle, the cleaning range R4 being wider than the cleaning range R2.

Thus, in the automated analyzer 100, the cleaning range of the stirring bar 142 is changed depending on whether or not the liquid 141 is stirred by the stirring part 140 in the second cycle.

When the cleaning range of the stirring bar 142 remains the same, the stirring bar 142 may have contaminated deposits on a boundary between a part immersed into the cleaning liquid 147 of the stirring bar 142 and a part not immersed into the cleaning liquid 147 of the stirring bar 142. When the contaminated deposits on the stirring bar 142 are mixed with the liquid 141 in the reaction container 26, measurement data may be adversely affected. Thus, for example, it is necessary for a user to periodically wipe off contaminated deposits on the stirring bar 142.

In contrast, in the automated analyzer 100, the cleaning range of the stirring bar 142 in the stirring of the liquid 141 by the stirring part 140 in the second cycle is different from that when the liquid 141 is not stirred by the stirring part 140 in the second cycle. This can reduce contaminated deposits on the stirring bar 142 as compared with the constant cleaning range of the stirring bar 142.

A narrow cleaning range allows the cleaned stirring bar 142 to move for a longer time than a wide cleaning range. The automated analyzer 100 reduces the cleaning range when a stirring operation is performed by the stirring part 140, and increases the cleaning range when a stirring operation is not performed by the stirring part 140. When a stirring operation is performed by the stirring part 140, the cleaning range is reduced and the cleaning time is shortened, ensuring a removal time of the cleaning liquid 147 on the stirring bar 142, that is, a time for reducing the amount of the cleaning liquid 147 on the stirring bar 142.

The cleaning of the stirring bar 142 of the first reaction-liquid stirring mechanism 14 was described above. Moreover, cleaning ranges for cleaning other stirring bars of the automated analyzer 100 may be similarly changed depending upon whether a stirring operation is to be performed in the subsequent cycle. Other stirring bars include, for example, the stirring bar of the dilution/stirring mechanism 9 and the stirring bar of the second reaction-liquid stirring mechanism 15.

The automated analyzer 100 includes the dispensing unit 70 that dispenses the liquid into the dilution container 23 by the original-specimen sampling probe 7, the original-specimen sampling probe cleaning mechanism 31 that cleans the original-specimen sampling probe 7, and the control unit 324 that controls the dispensing unit 70 and the original-specimen sampling probe cleaning mechanism 31. When the liquid is dispensed by the dispensing unit 70 in the second cycle subsequent to the first cycle, the control unit 324 sets the cleaning range R6 for cleaning the original-specimen sampling probe 7 in the second cycle. When the liquid is not dispensed by the dispensing unit 70 in the second cycle, the control unit 324 sets the cleaning range R8 for cleaning the original-specimen sampling probe 7 in the second cycle, the cleaning range R8 being wider than the cleaning range R6.

Thus, in the automated analyzer 100, the cleaning range of the original-specimen sampling probe 7 is changed depending on whether or not the liquid is dispensed by the original-specimen sampling probe 7 in the second cycle. This allows the automated analyzer 100 to reduce contaminated deposits on the original-specimen sampling probe 7. Moreover, the automated analyzer 100 can obtain a time for reducing the amount of the cleaning liquid 312 on the original-specimen sampling probe 7.

The cleaning of the original-specimen sampling probe 7 was described above. Moreover, cleaning ranges for cleaning other probes of the automated analyzer 100 may be similarly changed depending on whether a dispensing operation is to be performed in the subsequent cycle. Other probes include, for example, the diluted-specimen sampling probe 8, the first reagent dispensing probe 12, and the second reagent dispensing probe 13. For example, the first reagent dispensing probe 12 and the second reagent dispensing probe 13 dispense liquid containing the reagent instead of liquid containing the specimen.

6. Modifications

Modifications of the automated analyzer 100 will be described below. Differences from the example of the automated analyzer 100 will be described and an explanation of similar points is omitted.

6.1. First Modification

In the example of FIG. 3, the stirring-bar cleaning mechanism 146 cleans the stirring bar 142 by immersing the stirring bar 142 in the cleaning liquid 147. The method of cleaning the stirring bar 142 is not limited thereto. The stirring bar 142 may be cleaned by, for example, pouring the cleaning liquid 147 on the stirring bar 142. In this case, the stirring-bar cleaning mechanism 146 includes a cleaning-liquid pouring device (not illustrated) that pours the cleaning liquid 147 on the stirring bar 142. The cleaning-liquid pouring device is controlled by the control unit 324 of the controller 30.

For example, when the cleaning range of the stirring bar 142 is the cleaning range R2, the cleaning-liquid pouring device pours the cleaning liquid on the cleaning range R2 of the stirring bar 142.

Also for the original-specimen sampling probe cleaning mechanism 31, the cleaning liquid 312 may be poured on the original-specimen sampling probe 7 by the cleaning-liquid pouring device so as to clean the original-specimen sampling probe 7.

6.2. Second Modification

In the operations of the first reaction-liquid stirring mechanism 14 illustrated in FIG. 4, the cleaning range R4 is cleaned in the second cycle (S22) when a stirring operation is not performed in the second cycle.

In a second modification, the cleaning range R4 is cleaned in both of the first cycle and the second cycle when a stirring operation is not performed in the second cycle.

Figure 18:
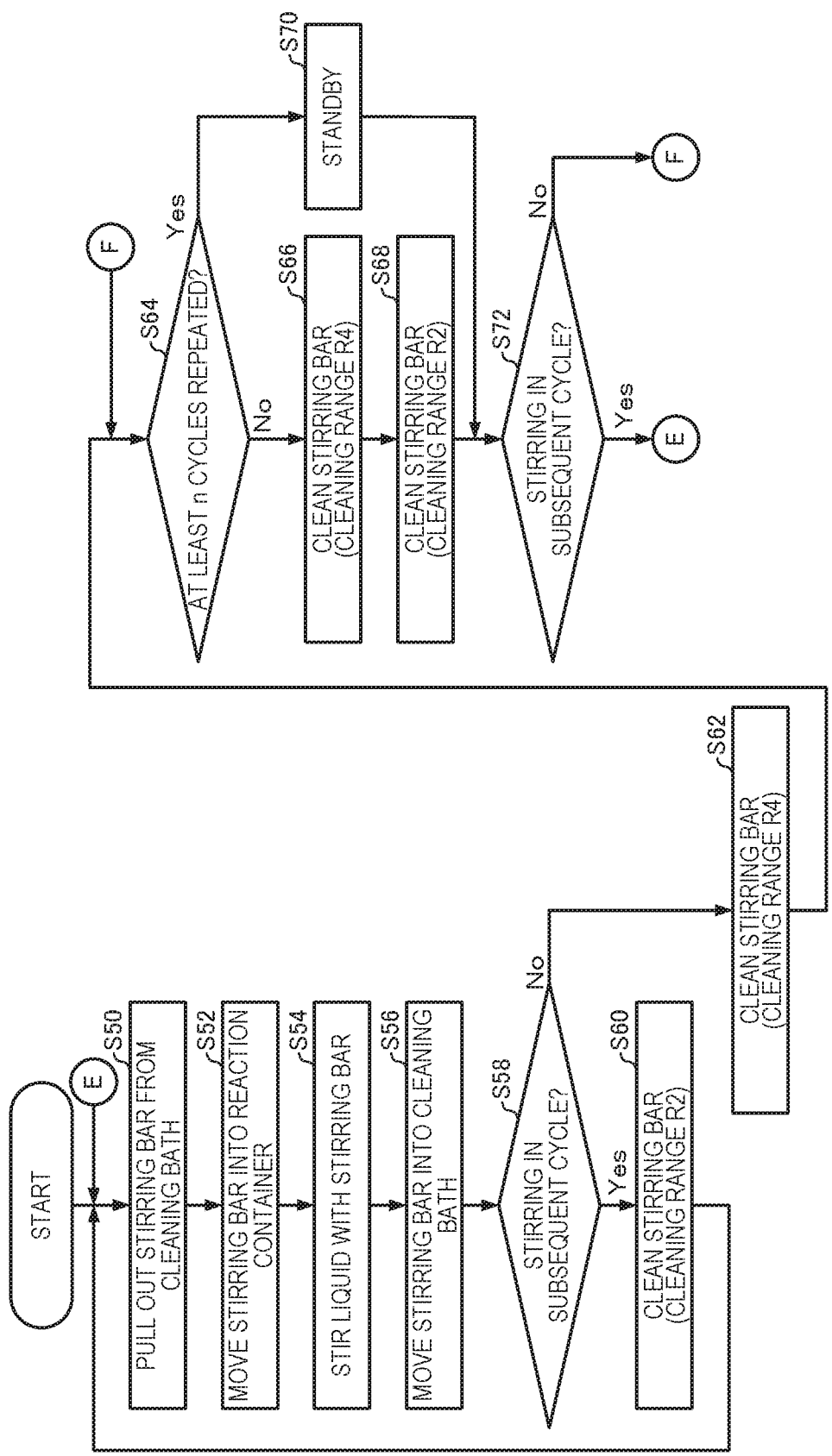
FIG. 18 is a flowchart illustrating a modification of the operations of the first reaction-liquid stirring mechanism.
Figure 19:
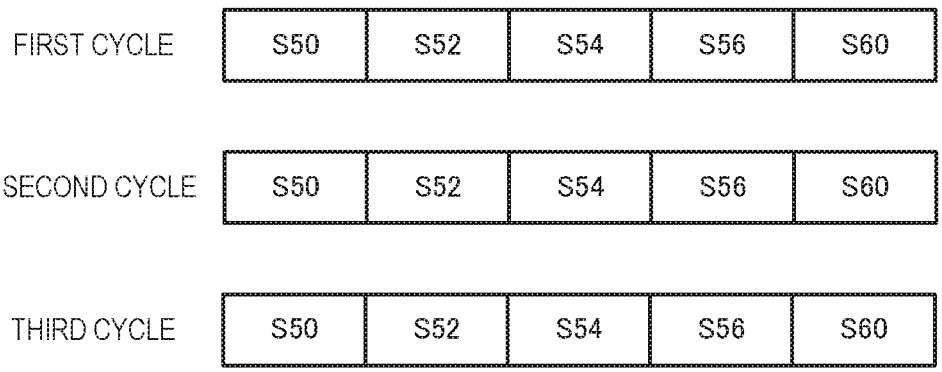
FIG. 19 is a diagram illustrating a modification of the operations of the first reaction-liquid stirring mechanism.
Figure 20:
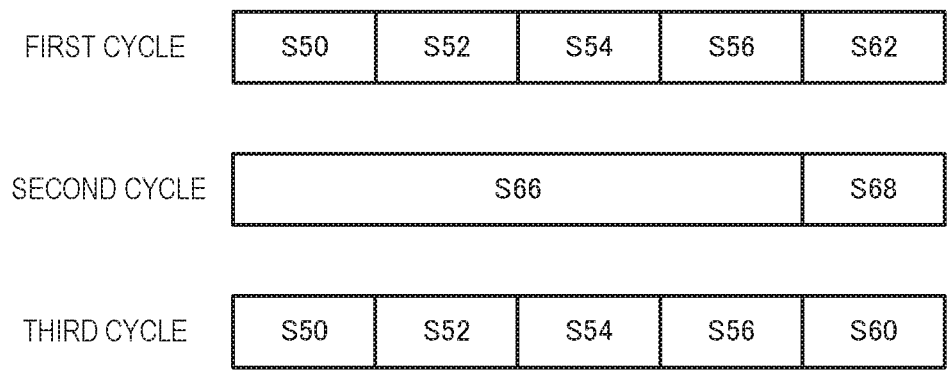
FIG. 20 is a diagram illustrating a modification of the operations of the first reaction-liquid stirring mechanism.

FIG. 18 is a flowchart illustrating a modification of the operations of the first reaction-liquid stirring mechanism 14. FIGS. 19 and 20 are diagrams illustrating the modification of the operations of the first reaction-liquid stirring mechanism 14. In FIG. 19, a stirring operation is performed in the first to third cycles. In FIG. 20, a stirring operation is performed in the first and third cycles but is not performed in the second cycle.

As indicated in FIG. 19, in the first cycle, the stirring bar 142 is pulled out of the cleaning bath 148 (S50), the stirring bar 142 is moved into the reaction container 26 (S52), the stirring operation is performed (S54), the stirring bar 142 is moved into the cleaning bath 148 (S56), and the cleaning range R2 is cleaned (S60) when a stirring operation is performed in the subsequent cycle (Yes at S58). The process then returns to step S50.

Step S50, step S52, step S54, step S56, and step S60 are equivalent to step S10, step S12, step S14, step S16, and step S18 in FIG. 4. A specific explanation thereof is omitted.

When a stirring operation is not performed in the second cycle (No at S58), the cleaning range R4 is cleaned (S62) in the first cycle as indicated in FIG. 20. When at least n cycles of cleaning the cleaning range R4 have not been repeated (No at S64), the cleaning range R4 is cleaned (S66) and the cleaning range R2 is cleaned (S68) in the second cycle. When at least n cycles of the cleaning operation for cleaning the cleaning range R4 have been repeated (Yes at S64), the stirring part 140 is placed on standby without cleaning the cleaning range (S70).

Step S62 and step S66 are equivalent to step S22 in FIG. 4. Step S68 corresponds to step S24 in FIG. 4.

After the cleaning of the cleaning range R2 in the second cycle (S68) or the standby state (S70), the process returns to step S50 when a stirring operation is performed in the subsequent cycle, that is, the third cycle (Yes at S72). When a stirring operation is not performed in the subsequent cycle (No at S72), the process returns to step S64.

In the second modification, the operations are repeated to analyze the specimen.

The control unit 324 controls the first reaction-liquid stirring mechanism 14 so as to perform the operations. Specifically, in the second modification, the control unit 324 cleans the cleaning range R2 of the stirring bar 142 in the first cycle subsequent to the first cycle when the liquid 141 is stirred by the stirring part 140 in the second cycle, and the control unit 324 cleans the cleaning range R4 of the stirring bar 142 in the first cycle and the second cycle when the liquid 141 is not stirred by the stirring part 140 in the second cycle, the cleaning range R4 being wider than the cleaning range R2.

Thus, also in the second modification, the cleaning range of the stirring bar 142 is changed depending on whether or not the liquid 141 is stirred by the stirring part 140 in the second cycle. This can reduce contaminated deposits on the stirring bar 142 as compared with the constant cleaning range of the stirring bar 142.

The second modification is also applicable to the dispensing unit 70. Specifically, when the liquid is dispensed by the dispensing unit 70 in the second cycle subsequent to the first cycle, the control unit 324 sets the cleaning range R6 for cleaning the original-specimen sampling probe 7 in the first cycle. When the liquid is not dispensed by the dispensing unit 70 in the second cycle, the control unit 324 sets the cleaning range R8 for cleaning the original-specimen sampling probe 7 in the first cycle and the second cycle, the cleaning range R8 being wider than the cleaning range R6.

6.3. Third Modification

Figure 21:
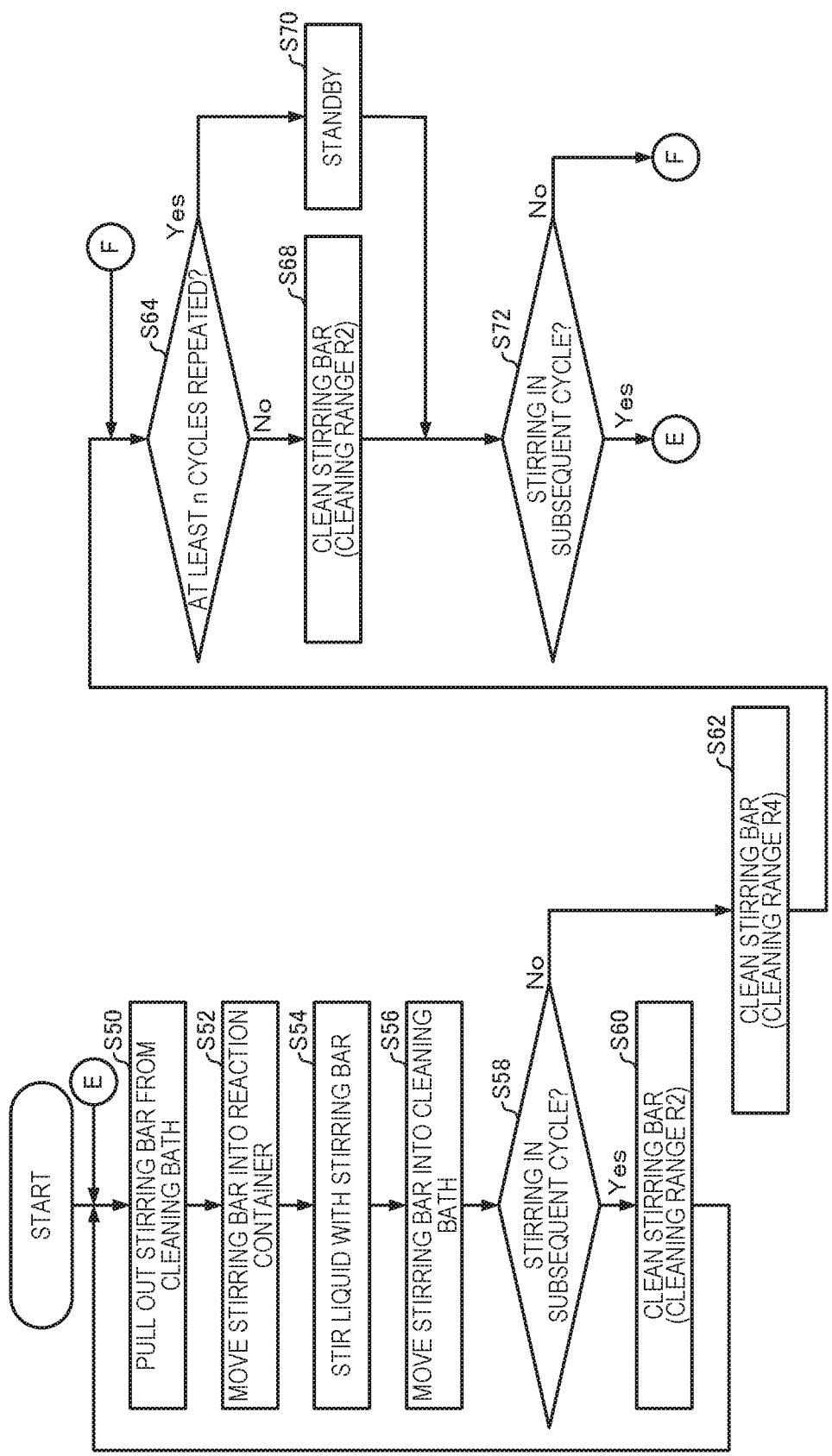
FIG. 21 is a flowchart illustrating a modification of the operations of the first reaction-liquid stirring mechanism.
Figure 22:
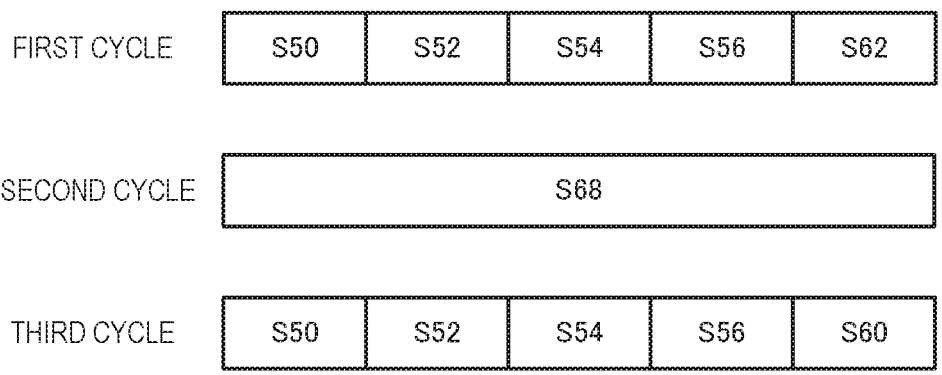
FIG. 22 is a diagram illustrating a modification of the operations of the first reaction-liquid stirring mechanism.

FIG. 21 is a flowchart illustrating a modification of the operations of the first reaction-liquid stirring mechanism 14. FIG. 22 is a diagram illustrating the modification of the operations of the first reaction-liquid stirring mechanism 14. In FIG. 22, a stirring operation is performed in the first and third cycles but is not performed in the second cycle.

In the second modification, when a stirring operation is not performed by the stirring part 140 in the second cycle, the cleaning range R4 is cleaned in both of the first cycle and the second cycle as indicated in FIGS. 18 and 20. In the third modification, when a stirring operation is not performed by the stirring part 140 in the second cycle, the cleaning range R4 is cleaned in the first cycle (S62) and the cleaning range R2 is cleaned in the second cycle (S68) without cleaning the cleaning range R4 (S66) as indicated in FIGS. 21 and 22. Other points are similar to those of the second modification in FIG. 18 and an explanation thereof is omitted.

The control unit 324 controls the first reaction-liquid stirring mechanism 14 so as to perform the operations. Specifically, in the third modification, the control unit 324 cleans the cleaning range R2 of the stirring bar 142 in the first cycle when the liquid 141 is stirred by the stirring part 140 in the second cycle subsequent to the first cycle, and the control unit 324 cleans the cleaning range R4 of the stirring bar 142 in the first cycle and the cleaning range R2 of the stirring bar 142 in the second cycle when the liquid 141 is not stirred by the stirring part 140 in the second cycle, the cleaning range R4 being wider than the cleaning range R2.

Thus, also in the third modification, the cleaning range of the stirring bar 142 is changed depending on whether or not the liquid 141 is stirred by the stirring part 140 in the second cycle. This can reduce contaminated deposits on the stirring bar 142 as compared with the constant cleaning range of the stirring bar 142.

The third modification is also applicable to the dispensing unit 70. Specifically, when the liquid is dispensed by the dispensing unit 70 in the second cycle subsequent to the first cycle, the control unit 324 sets the cleaning range R6 for cleaning the original-specimen sampling probe 7 in the first cycle. When the liquid is not dispensed by the dispensing unit 70 in the second cycle, the control unit 324 sets the cleaning range R8 for cleaning the original-specimen sampling probe 7 in the first cycle and the cleaning range R6 for cleaning the original-specimen sampling probe 7 in the second cycle, the cleaning range R8 being wider than the cleaning range R6.

6.4. Fourth Modification

In the automated analyzer 100, the specimen in the reaction container 26 is stirred by the stirring part 140. In the automated analyzer according to a fourth modification, the liquid 141 containing the specimen is stored in the reaction container 26 or the detergent for cleaning the stirring bar 142 is stored in the reaction container 26. When the stirring part 140 stirs the detergent in the reaction container 26, the cleaning range R4 of the stirring bar 142 is cleaned in the preceding cycle.

Figure 23:
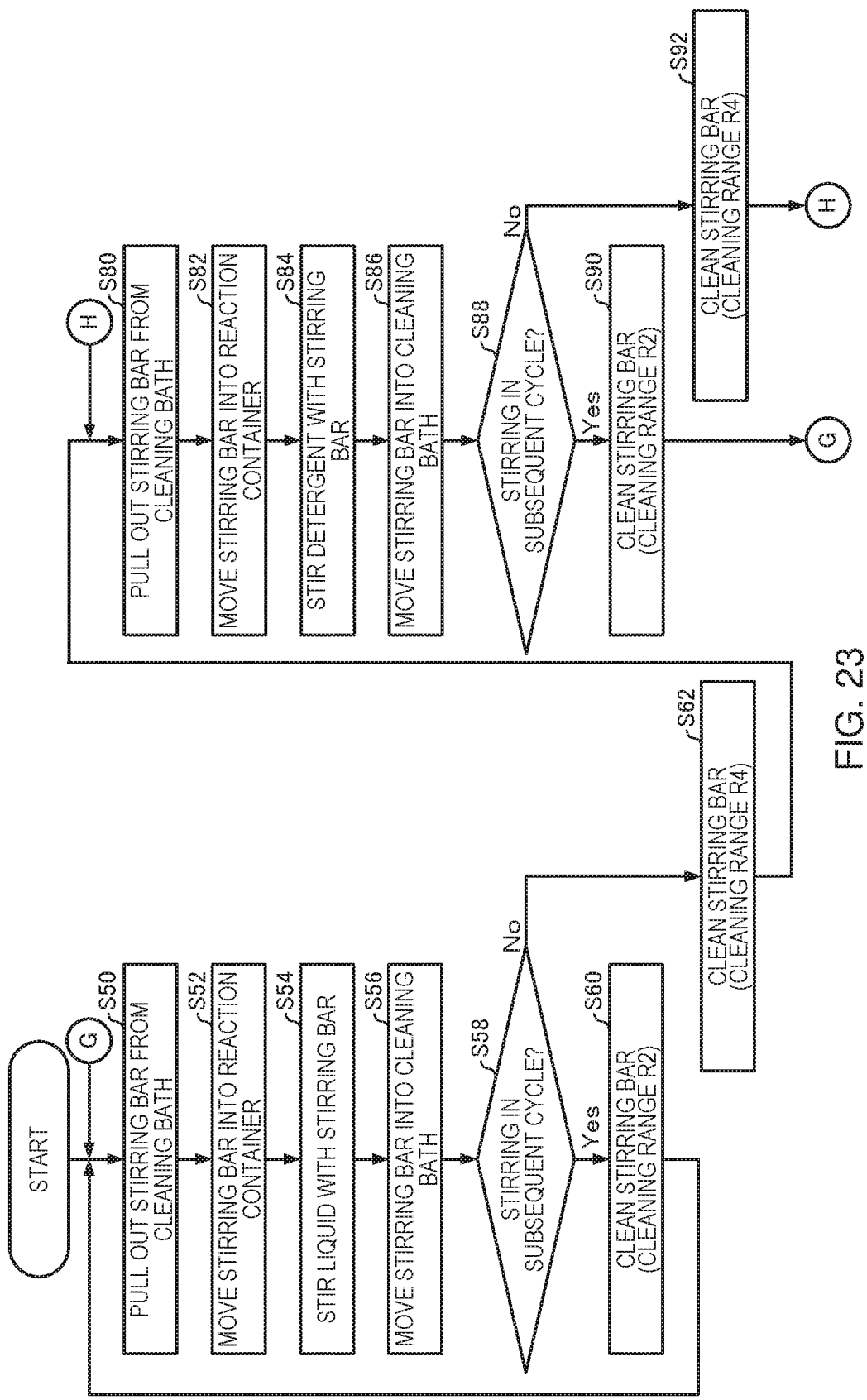
FIG. 23 is a flowchart illustrating a modification of the operations of the first reaction-liquid stirring mechanism.

FIG. 23 is a flowchart illustrating a modification of the operations of the first reaction-liquid stirring mechanism 14. FIG. 24 is a diagram illustrating the modification of the operations of the first reaction-liquid stirring mechanism 14. In FIG. 24, the liquid 141 containing the specimen is stirred in the first and third cycles, whereas the liquid 141 containing the specimen is not stirred in the second cycle.

When the specimen is not stirred in the second cycle (No at S58), that is, when the detergent is stirred in the second cycle, the cleaning range R4 is cleaned in the first cycle as indicated in FIG. 24 (S62). In the second cycle, the reaction turntable 6 moves the reaction container 26, which contains the dispensed detergent, to the stirring position, the stirring bar 142 is pulled out of the cleaning bath 148 (S80), the stirring bar 142 is moved into the reaction container 26 (S82), the detergent is stirred (S84), and the stirring bar 142 is moved into the cleaning bath 148 (S86).

When the specimen is stirred in the subsequent cycle, that is, the third cycle (Yes at S88), the cleaning range R2 is cleaned in the second cycle (S90) and then the process returns to step S50. When the specimen is not stirred in the subsequent cycle, (No at S88), the cleaning range R4 is cleaned in the second cycle (S92) and then the process returns to step S80.

The control unit 324 controls the first reaction-liquid stirring mechanism 14 so as to perform the operations. Specifically, in the fourth modification, the control unit 324 cleans the cleaning range R2 of the stirring bar 142 in the first cycle when the liquid 141 containing the specimen is stirred by the stirring part 140 in the second cycle subsequent to the first cycle, and the control unit 324 cleans the cleaning range R4 of the stirring part 140 in the first cycle when the liquid 141 containing the specimen is not stirred by the stirring part 140 in the second cycle, that is, when the detergent is stirred by the stirring part 140 in the second cycle, the cleaning range R4 being wider than the cleaning range R2.

Thus, also in the fourth modification, the cleaning range of the stirring bar 142 is changed depending on whether the liquid 141 is stirred by the stirring part 140 in the second cycle (or the detergent is stirred by the stirring part 140). This can reduce contaminated deposits on the stirring bar 142 as compared with the constant cleaning range of the stirring bar 142.

The fourth modification is also applicable to the dispensing unit 70. Specifically, when the liquid containing the specimen is dispensed by the dispensing unit 70 in the second cycle subsequent to the first cycle, the control unit 324 sets the cleaning range R6 for cleaning the original-specimen sampling probe 7 in the first cycle. When the liquid containing the specimen is not dispensed by the dispensing unit 70 in the second cycle (when the detergent is dispensed by the dispensing unit 70), the control unit 324 sets the cleaning range R8 for cleaning the original-specimen sampling probe 7 in the first cycle, the cleaning range R8 being wider than the cleaning range R6.

6.5. Fifth Modification

In the first to fourth modifications, the stirring bar 142 of the first reaction-liquid stirring mechanism 14 is cleaned. The first to fourth modifications are also applicable to other stirring bars of the automated analyzer 100.

The first to fourth modifications applicable to the cleaning of the original-specimen sampling probe 7 are similarly applicable to other probes of the automated analyzer 100. For example, in the application of the second to fourth modifications to the first reagent dispensing probe 12, the control unit 324 changes the cleaning range depending on whether or not the liquid containing the reagent is dispensed in the second cycle.

The invention is not limited to the above-described embodiments, and various modifications can be made. For example, the invention includes configurations that are substantially the same as the configurations described in the embodiments. Substantially same configurations means configurations that are the same in function, method, and results, or configurations that are the same in objective and effects, for example. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

What is claimed is:

1. An automated analyzer comprising:
  a stifling part provided with a stirring bar configured to stir a liquid containing a specimen, causing an adhesion of the liquid on the stirring bar, the adhesion having an adhesion range;
  a cleaning part configured to clean the stifling bar; and
  a control unit configured to control the stirring part and the cleaning part,
  wherein the control unit determines whether an operation of causing the stifling part to stir the liquid containing the specimen in a second cycle subsequent to a first cycle is necessary or not, based on information on measurement schedule of the specimen,
  wherein, in response to the control unit having determined that the operation of causing the stifling part to stir the liquid in the second cycle is necessary, the control unit performs a first processing that sets a range of the stifling bar to be cleaned in the second cycle as a first range, and
  wherein, in response to the control unit having determined that the operation of causing the stifling part to stir the liquid in the second cycle is not necessary, the control unit performs a second processing that sets a range of the stifling bar to be cleaned in at least one of the first cycle and the second cycle as a second range that is wider than the first range.

2. The automated analyzer according to claim 1, wherein the cleaning part comprises a cleaning bath for storing a cleaning liquid, and
  a range of immersion of the stirring bar in the cleaning liquid in the second processing is wider than a range of immersion of the stifling bar in the cleaning liquid in the first processing.

3. The automated analyzer according to claim 1, wherein the cleaning part comprises a cleaning-liquid pouring device that pours a cleaning liquid, and
a range of pouring of the cleaning liquid on the stirring bar in the second processing is wider than a range of pouring of the cleaning liquid on the stirring bar in the first processing.

4. The automated analyzer according to claim 1, wherein, in the second processing, the control unit sets a range of the stirring bar to be cleaned as the second range and the first range, and causes the cleaning part to clean the second range of the stirring bar and then the first range of the stirring bar.

5. A method of controlling an automated analyzer that includes a stifling part provided with a stirring bar, a cleaning part that cleans the stifling bar, and a control unit configured to control the stirring part and the cleaning part, the method comprising:

stirring, by the stifling part, a liquid containing a specimen, causing an adhesion of the liquid on the stirring bar, the adhesion having an adhesion range;

determining, by the control unit, whether an operation of causing the stirring part to stir the liquid containing the specimen in a second cycle subsequent to a first cycle is necessary or not, based on information on measurement schedule of the specimen;

setting, by the control unit, a range of the stirring bar to be cleaned in a second cycle as a first range in response to determining that the operation of causing the stirring part to stir the liquid in the second cycle is necessary; and setting, by the control unit, a range of the stirring bar to be cleaned in at least one of the first cycle and the second cycle as a second range that is wider than the first range in response to determining that the operation of causing the stirring part to stir the liquid in the second cycle is not necessary.

* * * * *

UNITED STATES PATENT AND TRADEMARK OFFICE
CERTIFICATE OF CORRECTION

PATENT NO. : 11,885,825 B2
APPLICATION NO. : 16/924589
DATED : January 30, 2024
INVENTOR(S) : Makoto Asakura It is certified that error appears in the above-identified patent and that said Letters Patent is hereby corrected as shown below:

In the Claims

Column 22, Line 36, Claim 1, delete "stifling" and insert -- stirring --

Column 22, Line 40, Claim 1, delete "stifling" and insert -- stirring --

Column 22, Line 44, Claim 1, delete "stifling" and insert -- stirring --

Column 22, Line 49, Claim 1, delete "stifling" and insert -- stirring --

Column 22, Line 52, Claim 1, delete "stifling" and insert -- stirring --

Column 22, Line 55, Claim 1, delete "stifling" and insert -- stirring --

Column 22, Line 58, Claim 1, delete "stifling" and insert -- stirring --

Column 22, Line 66, Claim 2, delete "stifling" and insert -- stirring --

Column 23, Line 14, Claim 5, delete "stifling" and insert -- stirring --

Column 23, Line 15, Claim 5, delete "stifling" and insert -- stirring --

Column 23, Line 18, Claim 5, delete "stifling" and insert -- stirring --

Signed and Sealed this
Nineteenth Day of March, 2024

Katherine Kelly Vidal
*Director of the United States Patent and Trademark Office*